US007716167B2

(12) United States Patent
Colossi et al.

(10) Patent No.: US 7,716,167 B2
(45) Date of Patent: May 11, 2010

(54) SYSTEM AND METHOD FOR AUTOMATICALLY BUILDING AN OLAP MODEL IN A RELATIONAL DATABASE

(75) Inventors: Nathan Gevaerd Colossi, San Jose, CA (US); Daniel Martin DeKimpe, La Selva Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 1517 days.

(21) Appl. No.: 10/325,245

(22) Filed: Dec. 18, 2002

(65) Prior Publication Data

US 2004/0122646 A1 Jun. 24, 2004

(51) Int. Cl.
*G06F 7/00* (2006.01)

(52) U.S. Cl. ........................................ 707/102; 707/103

(58) Field of Classification Search .................. 707/102, 707/100, 1–4, 103 R
See application file for complete search history.

(56) References Cited

U.S. PATENT DOCUMENTS

| 5,537,524 A | 7/1996 | Aprile |
| 5,594,897 A | 1/1997 | Goffman |
| 5,692,107 A | 11/1997 | Simoudis et al. |
| 5,692,175 A | 11/1997 | Davies et al. |
| 5,748,188 A | 5/1998 | Hu et al. |
| 5,767,854 A | 6/1998 | Anwar |
| 5,832,475 A | 11/1998 | Agrawal et al. |
| 5,832,496 A | 11/1998 | Anand et al. |
| 5,870,746 A | 2/1999 | Knutson et al. |
| 5,905,985 A | 5/1999 | Malloy et al. |
| 5,918,232 A | 6/1999 | Pouschine et al. |
| 5,926,815 A | 7/1999 | James, III |
| 5,926,818 A | 7/1999 | Malloy |

(Continued)

FOREIGN PATENT DOCUMENTS

JP 09106331 4/1997

(Continued)

OTHER PUBLICATIONS

Dennis Pedersen et al., "A powerful and SQL-compatible data model and query language for OLAP," ACM International Conference Protecting Series, 2002, pp. 121-130.

(Continued)

*Primary Examiner*—Albert W. Paladini
(74) *Attorney, Agent, or Firm*—Janaki K. Davda; Konrad Raynes & Victor LLP

(57) ABSTRACT

A system automatically generates OLAP metadata objects for a multidimensional analysis program such as OLAP from SQL statements without involving the database administrator, and eliminates the need for database administrators to manually perform this analysis and design. The system deconstructs a set of SQL statements into tables and aggregates metrics for measures and joins. It recognizes that the relational database structure contains both dimension tables and fact tables. Over many SQL statements, fact tables will have a large measure metric while dimension tables will have a low measure metric. Tables are linked based on large join metrics; small join metrics are ignored. The present system builds the OLAP cube model from the fact tables, dimension tables, and joins. The analysis of the SQL statements allows the system to map the hierarchies within the dimension table, and provides the system with information about attribute relationships and cubes.

30 Claims, 11 Drawing Sheets

U.S. PATENT DOCUMENTS

| | | |
|---|---|---|
| 5,943,668 A | 8/1999 | Malloy et al. |
| 5,960,423 A | 9/1999 | Chaudhuri et al. |
| 5,978,788 A | 11/1999 | Castelli et al. |
| 5,991,754 A | 11/1999 | Raitto et al. |
| 6,003,024 A | 12/1999 | Bair et al. |
| 6,003,036 A | 12/1999 | Martin |
| 6,031,977 A | 2/2000 | Pettus |
| 6,092,064 A | 7/2000 | Aggarwal et al. |
| 6,115,547 A | 9/2000 | Ghatate et al. |
| 6,122,636 A | 9/2000 | Malloy et al. |
| 6,134,532 A | 10/2000 | Lazarus et al. |
| 6,144,962 A | 11/2000 | Weinberg et al. |
| 6,175,836 B1 | 1/2001 | Aldred |
| 6,205,447 B1 | 3/2001 | Malloy ........................ 707/102 |
| 6,226,647 B1 | 5/2001 | Venkatasubramanian et al. |
| 6,249,791 B1 | 6/2001 | Osborn et al. |
| 6,292,797 B1 | 9/2001 | Tuzhilin et al. |
| 6,308,168 B1 | 10/2001 | Dovich et al. |
| 6,317,750 B1 | 11/2001 | Tortolani et al. |
| 6,324,533 B1 | 11/2001 | Agrawal et al. |
| 6,327,574 B1 | 12/2001 | Kramer et al. |
| 6,339,776 B2 | 1/2002 | Dayani-Fard et al. |
| 6,362,823 B1 | 3/2002 | Johnson et al. |
| 6,366,903 B1 | 4/2002 | Agrawal et al. |
| 6,374,234 B1 | 4/2002 | Netz |
| 6,385,604 B1 | 5/2002 | Bakalash et al. |
| 6,385,609 B1 | 5/2002 | Barshefsky et al. |
| 6,408,292 B1 | 6/2002 | Bakalash et al. |
| 6,418,428 B1 | 7/2002 | Bosch et al. |
| 6,421,665 B1 | 7/2002 | Brye et al. |
| 6,438,537 B1 | 8/2002 | Netz et al. |
| 6,449,609 B1 | 9/2002 | Witkowski |
| 6,477,536 B1 | 11/2002 | Pasumansky et al. |
| 6,480,836 B1 | 11/2002 | Colby et al. |
| 6,484,179 B1 | 11/2002 | Roccaforte |
| 6,539,371 B1 | 3/2003 | Bleizeffer et al. |
| 6,542,895 B1 | 4/2003 | DeKimpe et al. |
| 6,546,381 B1 | 4/2003 | Subramanian et al. |
| 6,546,395 B1 | 4/2003 | DeKimpe et al. |
| 6,567,796 B1 * | 5/2003 | Yost et al. ........................ 707/2 |
| 6,574,619 B1 | 6/2003 | Reddy et al. |
| 6,574,791 B1 | 6/2003 | Gauthier et al. |
| 6,581,054 B1 | 6/2003 | Bogrett |
| 6,581,068 B1 | 6/2003 | Bensoussan et al. |
| 6,604,110 B1 | 8/2003 | Savage et al. |
| 6,609,123 B1 | 8/2003 | Cazemier et al. |
| 6,615,201 B1 | 9/2003 | Seshadri et al. |
| 6,628,312 B1 | 9/2003 | Rao et al. |
| 6,633,882 B1 | 10/2003 | Fayyad et al. |
| 6,633,885 B1 | 10/2003 | Agrawal et al. |
| 6,636,845 B2 | 10/2003 | Chau et al. |
| 6,636,853 B1 | 10/2003 | Stephens, Jr. |
| 6,643,633 B2 | 11/2003 | Chau et al. |
| 6,643,661 B2 | 11/2003 | Polizzi et al. |
| 6,651,055 B1 | 11/2003 | Kilmer et al. |
| 6,654,764 B2 | 11/2003 | Kelkar et al. |
| 6,665,682 B1 | 12/2003 | DeKimpe et al. |
| 6,671,689 B2 | 12/2003 | Papierniak |
| 6,681,223 B1 | 1/2004 | Sundaresan |
| 6,684,207 B1 | 1/2004 | Greenfield et al. |
| 6,694,322 B2 | 2/2004 | Warren et al. |
| 6,697,808 B1 | 2/2004 | Hurwood et al. |
| 6,707,454 B1 | 3/2004 | Barg et al. |
| 6,711,579 B2 | 3/2004 | Balakrishnan |
| 6,711,585 B1 | 3/2004 | Copperman et al. |
| 6,714,940 B2 | 3/2004 | Kelkar |
| 6,768,986 B2 | 7/2004 | Cras et al. |
| 6,775,662 B1 | 8/2004 | Witkowski et al. |
| 6,801,992 B2 | 10/2004 | Gajjar et al. |
| 6,823,334 B2 | 11/2004 | Vishnubhotla et al. |
| 6,831,668 B2 * | 12/2004 | Cras et al. ........................ 715/853 |
| 6,842,758 B1 * | 1/2005 | Bogrett ........................ 707/100 |
| 6,865,573 B1 | 3/2005 | Hornick et al. |
| 6,871,140 B1 | 3/2005 | Florance et al. |
| 6,898,603 B1 | 5/2005 | Petculescu et al. |
| 6,931,418 B1 * | 8/2005 | Barnes ........................ 707/10 |
| 6,947,929 B2 * | 9/2005 | Bruce et al. ........................ 707/5 |
| 6,957,225 B1 | 10/2005 | Zait et al. |
| 6,996,556 B2 | 2/2006 | Boger et al. |
| 7,007,039 B2 | 2/2006 | Chaudhuri et al. |
| 7,051,038 B1 | 5/2006 | Yeh et al. |
| 7,139,764 B2 | 11/2006 | Lee |
| 7,149,983 B1 | 12/2006 | Robertson et al. |
| 7,162,464 B1 | 1/2007 | Miller et al. |
| 7,181,450 B2 | 2/2007 | Malloy et al. |
| 7,188,090 B2 | 3/2007 | Kim et al. |
| 7,191,169 B1 | 3/2007 | Tao |
| 7,203,671 B1 | 4/2007 | Wong |
| 7,246,116 B2 | 7/2007 | Barsness et al. |
| 7,266,565 B2 | 9/2007 | Diab |
| 7,275,024 B2 | 9/2007 | Yeh et al. |
| 7,346,601 B2 | 3/2008 | Chaudhuri et al. |
| 7,430,562 B1 | 9/2008 | Bedell et al. |
| 7,447,687 B2 | 11/2008 | Andersch et al. |
| 7,472,127 B2 | 12/2008 | Malloy et al. |
| 7,480,663 B2 | 1/2009 | Colossi et al. |
| 2001/0026276 A1 | 10/2001 | Sakamoto et al. |
| 2001/0037228 A1 | 11/2001 | Ito et al. |
| 2001/0037327 A1 | 11/2001 | Haas et al. |
| 2001/0047355 A1 | 11/2001 | Anwar |
| 2001/0047364 A1 | 11/2001 | Proctor |
| 2001/0051947 A1 | 12/2001 | Morimoto et al. |
| 2001/0055018 A1 | 12/2001 | Yaginuma et al. |
| 2002/0002469 A1 | 1/2002 | Hillstrom |
| 2002/0029207 A1 | 3/2002 | Bakalash et al. |
| 2002/0073088 A1 | 6/2002 | Beckmann et al. |
| 2002/0078039 A1 | 6/2002 | Cereghini et al. |
| 2002/0087516 A1 | 7/2002 | Cras et al. ........................ 707/2 |
| 2002/0091679 A1 | 7/2002 | Wright |
| 2002/0091681 A1 | 7/2002 | Cras et al. |
| 2002/0095430 A1 | 7/2002 | Egilsson et al. |
| 2002/0122078 A1 | 9/2002 | Markowski |
| 2002/0123993 A1 | 9/2002 | Chau et al. |
| 2002/0124002 A1 | 9/2002 | Su et al. ........................ 707/100 |
| 2002/0129003 A1 | 9/2002 | Bakalash et al. |
| 2002/0129032 A1 | 9/2002 | Bakalash et al. |
| 2002/0138316 A1 | 9/2002 | Katz et al. |
| 2002/0143783 A1 | 10/2002 | Bakalash et al. |
| 2002/0188587 A1 | 12/2002 | McGreevy |
| 2002/0188599 A1 | 12/2002 | McGreevy |
| 2003/0004914 A1 | 1/2003 | McGreevy |
| 2003/0004942 A1 | 1/2003 | Bird |
| 2003/0014397 A1 | 1/2003 | Chau et al. |
| 2003/0033277 A1 | 2/2003 | Bahulkar et al. |
| 2003/0055813 A1 | 3/2003 | Chaudhuri |
| 2003/0055832 A1 | 3/2003 | Roccaforte |
| 2003/0061207 A1 | 3/2003 | Spektor |
| 2003/0071814 A1 | 4/2003 | Jou et al. |
| 2003/0078852 A1 | 4/2003 | Shoen et al. |
| 2003/0078913 A1 | 4/2003 | McGreevy |
| 2003/0081002 A1 | 5/2003 | De Vorchik et al. |
| 2003/0093424 A1 | 5/2003 | Chun et al. |
| 2003/0101202 A1 | 5/2003 | Kelkar et al. |
| 2003/0115183 A1 | 6/2003 | Abdo et al. |
| 2003/0115207 A1 | 6/2003 | Bowman et al. |
| 2003/0126144 A1 | 7/2003 | O'Halloran et al. |
| 2003/0184588 A1 | 10/2003 | Lee |
| 2003/0206201 A1 | 11/2003 | Ly |
| 2003/0212667 A1 | 11/2003 | Andersch et al. |
| 2003/0225768 A1 | 12/2003 | Chaudhuri et al. |
| 2004/0006574 A1 | 1/2004 | Witkowski et al. |
| 2004/0010505 A1 | 1/2004 | Vishnubhotla |
| 2004/0059705 A1 | 3/2004 | Wittke et al. |
| 2004/0098415 A1 | 5/2004 | Bone et al. |

| | | | |
|---|---|---|---|
| 2004/0122844 | A1 | 6/2004 | Malloy et al. |
| 2004/0128287 | A1 | 7/2004 | Keller et al. |
| 2004/0128314 | A1 | 7/2004 | Katibah et al. |
| 2004/0139061 | A1 | 7/2004 | Colossi et al. |
| 2004/0181502 | A1 | 9/2004 | Yeh et al. |
| 2004/0181538 | A1 | 9/2004 | Lo et al. |
| 2004/0215626 | A1 | 10/2004 | Colossi et al. |
| 2004/0267774 | A1 | 12/2004 | Lin et al. |
| 2005/0027754 | A1 | 2/2005 | Gaijar et al. |
| 2005/0033730 | A1 | 2/2005 | Chaudhuri et al. |
| 2005/0267868 | A1 | 12/2005 | Liebl et al. |
| 2005/0278290 | A1 | 12/2005 | Bruce et al. |
| 2005/0283494 | A1 | 12/2005 | Colossi et al. |

FOREIGN PATENT DOCUMENTS

| | | |
|---|---|---|
| JP | 09146962 | 6/1997 |
| JP | 10247197 | 9/1998 |
| JP | 2001243242 | 9/2001 |
| JP | 2001243244 | 9/2001 |
| JP | 2002-007435 | 1/2002 |
| JP | 2002123530 | 4/2002 |
| WO | 0022493 | 4/2000 |
| WO | 0065479 | 11/2000 |
| WO | 0072165 | 11/2000 |
| WO | 0109768 | 2/2001 |
| WO | WO 01/29690 A2 | 4/2001 |

OTHER PUBLICATIONS

"Query Optimization By Using Derivability In A Data Warehouse Environment," Data Warehousing And OLAP Archive, Proceedings Of The Third ACM International Workshop On Data Warehousing And OLAP, 2000.
Goil, et al. "A Parallel Scalable Infrastructure for OLAP and Data Mining," Northwestern University, undated and unattributed document; 9 pp.
Hedberg, S. R., "Parallelism Speeds Data Mining," IEEE Parallel & Distributed Technology, Winter 1995; pp. 3-6.
IBM Corporation, "IBM QMF for Windows for DB2 Workstation Databases, V7.2-Business Intelligence Starts Here!" IBM Software Announcement, Feb. 26, 2002, 6 pp.
IBM Corporation, "QMF High Performance Option User's Guide for z/OS and OS/390", IBM Query Management Facility, Version 7 Release 2, SC27-0724-01, 2nd ed. Mar. 2002; pp. i-x and 1-338.
Lumpkin, et al. "Query Optimization in Oracle9i," Oracle White Paper, Feb. 2002; 30 pp.
Oracle Corporation, "Oracle9i OLAP Services: Concepts and Administration Guide, Release 1 (9.0.1)", Jun. 2001, A88755-01, pp. i through Index.
Pires, et al., "Database Query Optimizer with Rule Based Search Engine", SugerloafPLoP 2002 Proceedings, pp. 5-20.
Shukla, et al., "Materialized View Selection for Multi-cube Data Models", Proceedings of the 7th International Conference on Extending Database Technology, Mar. 2000, pp. 269-284.
Toyama, M. "SuperSQL: An Extended SQL for Database Publishing and Presentation," Proc. 1998 ACM SIGMOD, Jun. 1-4, 1998, vol. 27, No. 2; 6 pp.
U.S. Appl. No. 09/602,490, filed Jun. 23, 2000; Kraft et al.; 47 pp.
Warshaw, et al. "Rule-Based Query Optimization, Revisited," 8th Intl. Conf. Information Knowledge Management CIKM'99; Nov. 2-6, 1999; pp. 267-275.
Goil, et al. "A Parallel Scalable Infrastructure for OLAP and Data Mining," Northwestern University, undated and unattributed document; 9 pp., 1999.
Hedberg, S. R., "Parallelism Speeds Data Mining," IEEE Parallel & Distributed Technology, Winter 1995; pp. 3-6.
IBM Corporation, "IBM QMF for Windows for DB2 Workstation Databases, V7.2- Business Intelligence Starts Here!" IBM Software Announcement, Feb. 26, 2002, 6 pp.
IBM Corporation, "QMF High Performance Option User's Guide for z/OS and OS/390", IBM Query Management Facility, Version 7 Release 2, SC27-0724-01, 2nd ed. Mar. 2002; pp. i - x and 1-338.
Lumpkin, et al. "Query Optimization in Oracle9i," Oracle White Paper, Feb. 2002; 30 pp.
Oracle Corporation, "Oracle9i OLAP Services: Concepts and Administration Guide, Release 1 (9.0.1)", Jun. 2001, A88755-01, pp. i through Index.
Pires, et al., "Database Query Optimizer with Rule Based Search Engine", SugerloafPLoP 2002 Proceedings, pp. 5-20.
Shukla, et al., "Materialized View Selection for Multi-cube Data Models", Proceedings of the 7th International Conference on Extending Database Technology, Mar. 2000, pp. 269-284.
Andres, F., M Noureddine, K . Ono and A. Zhang, "Metadata Model, Resource Discovery, and Querying on Large Scale Multidimensional Datasets- The GEREQ Project", Proceedings 2000 Kyoto International Conference on Digital Libraries: Research and Practice, 2000, pp. 312-319.
Chen, Q., "Mining Exceptions and Quantitative Association Rules in OLAP Data Cube", Master Thesis, Jul. 1999, 113 pp.
Hammer, J. & L. Fu, "CubiST++: Evaluating Ad-Hoc CUBE Queries Using Statistics Trees ", Distributed and Parallel Databases, vol. 14, No. 3, 2003, pp. 221-254.
Hess, T.J. & J.D. Wells, "Understanding How Metadata and Explanations Can Better Support Data Warehousing and Related Decision Support Systems: An Exploratory Case Study", Proceedings of the 35th Hawaii International Conference on System Sciences, 2002, 10 pp.
Schwarz, H., R. Wagner, & B. Mitschang, "Improving the Processing of Decision Support Queries: The Case for a DSS Optimizer", Proceedings of the 2001 International Database Engineering and Applications Symposium, 2001, pp. 177-186.
Andres, F., M Noureddine, K . Ono and A. Zhang, "Metadata Model, Resource Discovery, and Querying on Large Scale Multidimensional Datasets- The GEREQ Project", Proceedings 2000 Kyoto International Conference on Digital Libraries: Research and Practice, 2000, pp. 312-319.
Colossi, N., W. Malloy, and B. Reinwald, "Relational extensions for OLAP", IBM Systems Journal, vol. 41, No. 4, 2002, pp. 714-731.
Huynh, T. N., 0. Mangisengi, A.M., Tjoa, "Metadata for Object-Relational Data Warehouse", Proceedings of the International Workshop on Design and Management of Data Warehouses, Jun. 2000, 9 pp.
Mullins, C.S., "Get Your Business Where it Needs to Go", [online], 2003, [Retrieved on Jan. 29, 2008], retrieved from the Internet at <URL: http://www.craigmullins.com/db2infra.htm>, 4 pp.
Oracle, "Oracle OLAP Analytic Workspace Java API Reference", [online], 2003, [Retrieved on Jan. 29, 2008], retrieved from the Internet at <URL: http://www.acs.ilstu.edu/docs/oracle/olap.101/b12180/overview-summary.html>, 4 pp.
Poelman, J., "How to Build a Metadata Bridge for DB2 Cube Views", [online], May 2003, [Retrieved on Jan. 29, 2008], retrieved from the Internet at <URL: http://www.ibm.com/developerworks/db2/library/ techarticle/0305poelman/0305poelnrian.h. . . >, 15 pp.
SAP America Inc. "Multi-Dimensional Modeling with BW", SAP America white paper, 2000, pp. 1-68.
U.S. Appl. No. 11/971,157, filed on Jan. 8, 2008, entitled "Systems and Computer Program Products to Browse Database Query Information", invented by C. Andersch, M.L. Coates, and G. Saueressig, 28 pp.
Rudensteiner, E.A., A. Koeller, and X. Zhang, "Maintaining Data Warehouses Over Changing Information Sources", Communications of the ACM, Jun. 2000, vol. 43, No. 6, pp. 57-62.
Shah, K. And A. Sheth, "InfoHarness: Managing Distributed, Heterogeneous Information" IEEE Internet Computing, Nov.-Dec. 1999, vol. 3, Iss. 6, pp. 18-28.
Alcorn, M.N., "Seeing is Believing", DB2 Magazine, Quarter 1, 2004, vol. 9, Iss. 1, [online], [retrieved on Jun. 28, 2007], retrieved from the Internet at <URL: http://www.db2mag.com/shared/printableArticle.jhtml?articleID=17602307>, 15 pp.
Oracle, "Chapter 4: Discovering the Available Metadata," Oracle OLAP Developer's Guide to the OLAP API 10g Release 1 (10.1), [online], 2003, [Retrieved on Jun. 28, 2007], retrieved from the Internet at <URL: http://www. stanford.edu/deptitss/docs/oracle/10g/olap.101/b10335/discover.htm>, 16 pp.

Poole, J.D.,"Model_Driven Architecture: Vision, Standards and Emerging Technologies", ECOOP 2001, Apr. 2001, 15 pp.

Amendment, Nov. 24, 2004, for International Application No. PCT/GB03/005490, 4 pp.

Amendment, Mar. 31, 2005, for International Application No. PCT/GB03/005490, 3 pp.

Bird, C.L. and S.G. Chapman, "Viewing Data Within a Three-Dimensional Space by Two-Dimensional Devices", IBM TDB, vol. 34, No. 12, May 1992, pp. 83-84.

Bito, Y., R. Kero, H. Matsuo, Y. Shintani, and M. Silver, "Interactively Visualizing Data Warehouses", Journal of Healthcare Information Management, vol. 15, No. 2, 2001, pp. 133-142.

Cheung, D.W., B. Zhou, B. Kao, H. Lu, T.W. Lam, and H.F. Ting, "Requirement-Based Data Cube Schema Design", Proceedings of the Eighth International Conference on Information and Knowledge Management, 1999, pp. 162-169.

Cheung, D.W., B. Zhou, B. Kao, H. Kan, and S.D. Lee, "Towards the Building of a Dense-Region-Based Olap System", Data & Knowledge Engineering, vol. 36, Issue 1, Jan. 2001, 27 pp.

Colliat, G., "OLAP, Relational, and Multidimensional Database Systems", Sigmod Record, vol. 25, No. 3, Sep. 1996, pp. 64-69.

E.F. Codd Associates, "Providing OLAP to User-Analysts: An IT Mandate", [online] 1998, [retrieved on Oct. 8, 2002], retrieved from the Internet at <URL: http://www.hyperion.com/downloads/olap_to_useranalysts_wp.pdf>, pp. 1-22.

Eick, S.G., "New Visualization Techniques", SIGGRAPH Computer Graphics Newsletter, vol. 34, No. 1, [online] Feb. 2000, [retrieved on Apr. 8, 2004], retrieved from the Internet at <URK: http://www.siggraph.org/publications/newsletter/v34n1/contributions/Eick.html>, 11 pp.

Final Office Action 1, Jan. 5, 2006, for U.S. Appl. No. US10/323,131, 14 pp.

Final Office Action 1, Jan. 5, 2006, for U.S. Appl. No. US101341,763, 18 pp.

Final Office Action 1, for Mar. 2, 2006, for U.S. Appl. No. US101410,793, 22 pp.

Final Office Action 1, Oct. 4, 2007, for U.S. Appl. No. US101874,398, 32 pp.

Final Office Action 2, Nov. 1, 2006, for U.S. Appl. No. US10/341,763, 24 pp.

Final Office Action 2, Mar. 27, 2007, for U.S. Appl. No. US10/410,793, 23 pp.

Final Office Action 3, Apr. 24, 2008, for U.S. Appl. No. US10/410,793, 19 pp.

Goil, S., and A. Choudhary, "High Performance Multidimensional Analysis of Large Datasets", Proceedings of the 1st ACM International Workshop on Data Warehousing and OLAP, 1998, pp. 34-39.

Gray, J., S. Chaudhuri, A. Bosworth, A. Layman, D. Reichart, M. Venkatrao, F. Pellow, and H. Pirahesh, " Data Cube: A Relational Aggregation Operator Generalizing Group-By, Cross-Tab, and Sub-Totals", Data Mining and Knowledge Discovery 1, 1997, pp. 29-53.

International Preliminary Examination Report, Apr. 11, 2005, for International Application No. PCT/GB03/05490, 11 pp.

International Search Report, Apr. 16, 2004, for International Application No. PCT/GB03/05490, 5 pp.

Kenan Systems Corporation, "An Introduction to Multidimensional Database Technology", [online], 1995, [retrieved on Apr. 4, 2008], retrieved from the Internet at <URL: http://www.fing.edu.uy/inco/grupos/csi/esp/Cursos/cursos_act/2003DAP_SistDW/Material/ken96.pdf>, pp. 1-29.

Kotidis, Y. and N. Roussopoulos, "An Alternative Storage Organization for ROLAP Aggregate Views Based on Cubetrees", ACM SIGMOD Record, vol. 27, Issue 2, Jun. 1998, pp. 249-258.

Mangisengi, O., A.M. Tjoa, and R.R. Wagner, "Metadata Management Concept for Multidimensional OLAP Data based on Object-Oriented Concepts", Proceedings of the First International Conference on Web Information Systems Engineering, 2000, vol. 1, pp. 358-365.

Maniatis, A.S., P. Vassiliadis, S. Skiadopoulos, and Y. Vassiliou, "Advanced Visualization for OLAP", Proceedings of the 6th ACM International Workshop on Data Warehousing and OLAP, Nov. 2003, pp.9-16.

Microsoft Corp. And Hyperion Solutions Corp., "XML for Analysis Specification", Version 1.0, updated Apr. 24, 2001, 107 pp.

Nippl, C. and B. Mitschang, "Topaz: A Cost-Based, Rule-Driven, Multi-Phase Parallelizer", Proceedings of the 24th VLDB Conference, 1998, pp. 251-262.

Notice of Allowance 1, Nov. 4, 2005, for U.S. Appl. No. US10/144,347, 8 pp.

Notice of Allowance 1, Apr. 19, 2005, for U.S. Appl. No. US10/144,540, 11 pp.

Notice of Allowance 1, May 19, 2006, for U.S. Appl. No. US10/323,131, 9 pp.

Notice of Allowance 1, Dec. 11, 2008, for U.S. Appl. No. US10/874,397, 17 pp.

Notice of Allowance 1, Sep. 3, 2008, for U.S. Appl. No. US10/874,398, 16 pp.

Notice of Allowance 2, Oct. 18, 2007, for U.S. Appl. No. US10/144,347, 13 pp.

Notice of Allowance 2, Sep. 20, 2006, for U.S. Appl. No. US10/323,131, 13 pp.

Notice of Allowance 3, Jun. 25, 2008, for U.S. Appl. No. US10/144,347, 16 pp.

Office Action 1, Sep. 24, 2004, for U.S. Appl. No. US10/144,347, 18 pp.

Office Action 1, Oct. 13, 2004, for U.S. Appl. No. US10/144,540, 15 pp.

Office Action 1, Jul. 5, 2005, for U.S. Appl. No. US10/323,131, 15 pp.

Office Action 1, Jul. 21, 2005, for U.S. Appl. No. US10/341,763, 27 pp.

Office Action 1, Sep. 20, 2005, for U.S. Appl. No. US10/410,793, 26 pp.

Office Action 1, Mar. 14, 2007, for U.S. Appl. No. US10/874,397, 27 pp.

Office Action 1, Mar. 5, 2007, for U.S. Appl. No. US10/874,398, 33 pp.

Office Action 2, May 10, 2005, for U.S. Appl. No. US10/144,347, 14 pp.

Office Action 2, Oct. 4, 2007, for U.S. Appl. No. US10/874,397, 39 pp.

Office Action 3, Jul. 26, 2006, for U.S. Appl. No. US10/144,347, 8 pp.

Office Action 3, May 22, 2006, for U.S. Appl. No. US10/341,763, 15 pp.

Office Action 3, Sep. 19, 2006, for U.S. Appl. No. US10/410,793, 30 pp.

Office Action 3, Apr. 7, 2008, for U.S. Appl. No. US10/874,397, 26 pp.

Office Action 3, Mar. 3, 2008, for U.S. Appl. No. US10/874,398, 24 pp.

Office Action 4, Jan. 29, 2007, for U.S. Appl. No. US10/144,347, 12 pp.

Office Action 5, Jun. 27, 2007, for U.S. Appl. No. US10/144,347, 11 pp.

Office Action 5, Oct. 19, 2007, for U.S. Appl. No. US10/410,793, 18 pp.

Office Action 6, Aug. 20, 2008, for U.S. Appl. No. US10/410,793, 18 pp.

Pendse, N., "The OLAP Report: What is OLAP?", [online], Updated Jul. 27, 2002, [retrieved on Oct. 8, 2002], retrieved from the Internet at <URL: http:/lwww.olapreport.com/fasmi>, 7 pp.

Pokorny, J. and P. Sokolowsky, "A Conceptual Modelling Perspective for Data Warehouses", [online], 1999, [retrieved on Apr. 8, 2004], retrieved from the Internet at <URL: http://wi99.iwi.uni-sb.de/teilnehmer/pdf-files/ EF_32_WiB082.pdf>, 20 pp.

Post, L.L. and J.J. Sydir, "Dynamically Configurable User Interface for the Manipulation of Data Objects", IBM TDB, vol. 37, No. 3, Mar. 1994, pp. 23-30.

Rabenhorst, D.A "Many-Dimensional Visualization Technique", IBM TDB, vol. 35, No. 6, Nov. 1992, pp. 473-475.

Rai, A. and V. Storey, "Data Mining Multidimensional Databases, OLAP (Online Analytical Processing), & Data Warehousing", [online] 2001, [retrieved on Apr. 8, 2004], retrieved from the Internet at <URL: http://www.cis.gsu.edu/—dstraub/JMBA/MBA8473/2001/DataMine3-2ups.pdf>, 40 pp.

Raphaely, D., "Oracle 8i Application Developer's Guide-Fundamentals", Release 8.1.5, Part No. A68003-01, Feb. 1999, 24 pp.

Sapia, C., M. Blaschka, G. Hofling, and B. Dinter, "Extending the E/R Model for the Multidimensional Paradigm", Proceedings of the Workshops on Data Warehousing and Data Mining: Advances in Database Technologies, 1998, pp. 105-116.

Sifer, M., "A Visual Interface Technique for Exploring OLAP Data with Coordinated Dimension Hierarchies", Proceedings of the Twelfth International Conference on Information and Knowledge Management, Nov. 2003, pp. 532-535.

Stewart, H.M., "OLAP/EIS Tops Off the Data Warehouse", Proceedings of the 1995 CAUSE Annual Conference, 1995, pp. 1-16.

Stohr, T., R. Muller, and E. Rahm, "An Integrative and Uniform Model for Metadata Management in Data Warehousing Environments", Proceedings of the International Workshop on Design Management of Data Warehouses, 1999, 16 pp.

Stolte, C., D. Tang, and P. Hanrahan, "Query, Analysis, and Visualization of Hierarchically Structured Data Using Polaris", Proceedings of the Eighth ACM SIGKDD International Conference on Knowledge Discovery and Data Mining, 2002, 10 pp.

Final Office Action 1, Mar. 27, 2007, for U.S. Appl. No. US10/867,970, 21 pp.

Tang, D., C. Stolte, and R. Bosch, "Design Choices when Architecting Visualizations", Information Visualization, vol. 3, Iss. 2, 2004, 10 pp.

Vassiliadis, P., "Modeling Multidimensional Databases, Cubes and Cube Operations", Proceedings of the 10th International Conference on Scientific and Statistical Database Management, 1998, 10 pp.

W3C, "XML Path Language (XPath)", Version 1.0, [online], W3C Recommendation Nov. 16, 1999, [retrieved on Oct. 8, 2002], retrieved from the Internet at <URL: http://www.w3/prg/TR/xpath>, 37 pp.

Wolfram Research, Inc., "Hexagonal Prism", [online], 2004, [retrieved on Jun. 6, 2004], retrieved from the Internet at <URL: http://mathworld.wolfram.com/HexagonalPrism.html>, 2 pp.

Wolfram Research, Inc., "Polyhedron", [online], 2004, [retrieved on Jun. 6, 2004], retrieved from the Internet at <URL: http://mathworld.wolfram.com/Polyhedron.html>, 5 pp.

Wolfram Research, Inc., "Prism", [online], 2004, [retrieved on Jun. 6, 2004], retrieved from the Internet at <URL: http://mathworld.wolfram.com/Prism.html>, 5 pp.

Wolfram Research, Inc., "Triangular Prism", [online], 2004, [retrieved on Jun. 6, 2004], retrieved from the Internet at <URL: http://mathworld.wolfram.com/TriangularPrism.html>, 2 pp.

Written Opinion, Sep. 6, 2004, for International Application No. PCT/GB03105490, 7 pp.

Zhao, Y., P.M. Deshpande, J.F. Naughton, and A. Shukla, "Simultaneous Optimization and Evaluation of Multiple Dimensional Queries", ACM Sigmod Record, vol. 27, Iss. 2, Jun. 1998, pp. 271-282.

Zhou, B., "ScanChunk: An Efficient Algorithm for Hunting Dense Regions in Data Cube", Chines Journal of Computers, vol. 22, No. 6, Jun. 1999, pp. 620-626 [Abstract].

Final Office Action 2, Feb. 4, 2008, for U.S. Appl. No. US10/867,970, 13 pp.

Office Action 7, Feb. 12, 2009, for U.S. Appl. No. US10/410,793, 17 pp.

Howard, J., "DB2 Newsletter", [online], Jun. 2003, [Retrieved on Apr. 1, 2009]. Retrieved on the Internet at <URL: http://txmq.com/resources/newsletter_archive/db2news_jun03.htm>, 12 pp.

IBM, "IBM DB2 Information Integrator V8.1", Software Announcement May 20, 2003, 19 pp.

Morgan, R., "Web-based Interactive Database Query Builder", Sep. 2002, University of Bristol, Department of Computer Science, 101 pp.

White, C.J., "The IBM Business Intelligence Software Solution", Version 3, Mar. 1999, DataBase Associates International, Inc., 22 pp.

Notice of Allowance 1, Nov. 4, 2008, for U.S. Appl. No. US10/867,970, 11 pp.

Office Action 1, Nov. 14, 2006, for U.S. Appl. No. US10/867,970, 37 pp.

Office Action 3, Sep. 11, 2007, for U.S. Appl. No. US10/867,970, 9 pp.

Office Action 5, May 5, 2008, for U.S. Appl. No. US10/867,970, 11 pp.

Office Action 6, Apr. 14, 2009, for U.S. Appl. No. US10/867,970, 31 pp.

Abstract and Machine Translation for JP2001243244, published on Sep. 7, 2001, 46 pp.

Abstract and Machine Translation for JP2001243242, published on Sep. 7, 2001, 55 pp.

Abstract for JP2003500741, published Jan. 7, 2003, 1 pp [Abstract for corresponding case WO0072165].

Abstract for JP2003519418, published Jun. 17, 2003, 1 pp [Abstract for corresponding case WO0109768].

IDS Report, Jun. 16, 2009, from the Jun. 2, 2009 Office Action for JP2004-566154, 2 pp.

Japanese Office Action, Jun. 2, 2009, for Application No. JP2004-566154, 7 pp.

Japanese Office Action, Jun. 2, 2009, for Application No. JP2004-566154, 6 pp [Translation].

Notice of Allowance 2, May 29, 2009, for U.S. Appl. No. US10/874,397, 10 pp.

Han, J., S. Nishio, H. Kawano, and W. Wang, "Generalization-Based Data Mining in Object-Oriented Databases Using an Object Cube Model", Data & Knowledge Engineering 25 (1998) pp. 55-97.

Kamber, M., J. Han, and J.Y. Chiang, "Metarule-Guided Mining of Multi-Dimensional Association Rules Using Data Cubes", KDD-97 Proceedings, AAAI, pp. 207-210, 1997.

NOA2, Nov. 25, 2009, for U.S. Appl. No. 10/867,970, 14 pp.

Stefanovic, N., J. Han, and K. Koperski, "Object-Based Selective Materialization for Efficient Implementation of Spatial Data Cubes", IEEE Transactions on Knowledge and Data Engineering vol. 12, No. 6 Nov./Dec. 2000, pp. 938-958.

* cited by examiner

SYSTEM AND METHOD FOR AUTOMATICALLY BUILDING AN OLAP MODEL IN A RELATIONAL DATABASE

FIELD OF THE INVENTION

The present invention generally relates to multidimensional analysis programs for relational databases. More specifically, this invention pertains to a system and method for automatically creating OLAP (multidimensional) metadata objects from a relational database. This metadata can be used by OLAP products, such as relational OLAP (ROLAP), hybrid OLAP (HOLAP), and multidimensional OLAP (MOLAP), or by the relational database itself.

BACKGROUND OF THE INVENTION

Relational database management systems (RDBMs) have been in existence for many years. Historically, these database systems have had limited metadata. Though there was some metadata describing the tables, views and columns, little information existed about the relationships between tables and columns. Much of the semantic information for the database existed either in the user's concept of the database or possibly in a warehouse product In recent years, on-line analytical processing (OLAP) has become popular. OLAP systems provide more extensive metadata to describe multidimensional abstractions such as dimensions and hierarchies. Some commercial software products have been written to support OLAP.

The implementation of OLAP requires the introduction of additional metadata objects. Databases have been extended to support OLAP by introducing new objects on top of the relational database. Typically, a mechanism is provided to database administrators for defining OLAP objects. Software products use these objects to provide functional or performance improvements. However, the task of defining OLAP objects can be very time consuming. Many of these databases are very large, with many objects, fields, relationships, etc. Furthermore, many older databases have no documentation on the database design and organization. Consequently, database administrators must first analyze their database and then document its characteristics prior to defining the metadata. This time-consuming process requires skilled labor, and can be very expensive. In addition, without access to the original database programmer or documentation, the process of defining OLAP objects can be prone to error.

Users of relational databases having no concept of metadata may wish to take advantage of the higher, multidimensional capability of programs such as OLAP. However, OLAP objects must first be created for those relational databases. What is therefore needed is a system and associated method for quickly, efficiently, and automatically creating the OLAP objects for a relational database that does not have OLAP objects. The need for such a system and method has heretofore remained unsatisfied.

SUMMARY OF THE INVENTION

The present invention satisfies this need, and presents a system, a computer program product, and an associated method (collectively referred to herein as "the system" or "the present system") for automatically building an OLAP model in a relational database. The present system automatically creates OLAP (multidimensional) metadata objects from a relational database. This metadata can be used by OLAP products, such as relational OLAP (ROLAP), hybrid OLAP (HOLAP), and multidimensional OLAP (MOLAP), or by the relational database itself (collectively referred to herein as "OLAP").

The present system eases the transition from a non-OLAP relational database to one with OLAP objects. It is one feature of the present system to efficiently, quickly, and automatically create the OLAP structure for existing large databases.

The present system automatically generates OLAP objects from SQL statements without involving the database administrator, thus eliminating the need for database administrators to perform this analysis and design. The present system builds OLAP objects by analyzing stored SQL statements. Although SQL statements do not explicitly contain OLAP objects, it is possible to analyze the syntax of SQL statements, individually and in aggregate, to determine the OLAP objects.

The present system deconstructs or parses the SQL statement into tables and aggregate metrics for measures and joins. The system recognizes that relational database systems contain tables that function as facts and dimensions. Over many SQL statements, fact tables will have a large measure metric while dimension tables will have a low measure metric.

Tables are linked based on large join metrics, while relatively smaller join metrics are ignored. The present system builds the OLAP cube model from the fact tables, dimension tables, and joins. Within a dimension table there may exist one or more hierarchies; the analysis of the SQL statements allows the present system to map the hierarchies within the dimension table. In addition, the analysis of SQL statements provides the present system information about attribute relationships and cubes.

Three exemplary schemas exist for fact and dimension tables. The first schema is the star schema with all the dimension tables joined directly to the fact table. All the hierarchy information is contained within the dimension tables. The second schema is the snowflake schema with some dimensions connected directly to the fact table. Other dimensions are connected to the dimensions that connect to the fact table in a long dependency chain. Consequently, the hierarchy is spread over the dependency chain as opposed to being contained in one dimension table. The third schema is the known configuration of a dimension inside a fact table. The present system creates OLAP objects for these and/or other schemas. The result could be one or a combination of those three schemas. The dimension tables and fact tables can also be a combination of tables.

The metadata objects of the present system describe relational information as intelligent OLAP structures, but these metadata objects are different from traditional OLAP objects. The metadata objects of the present system store metadata, the information about the data in the base tables of the relational database. These metadata objects describe where pertinent data is located and further describe relationships within the base data. For example, a fact object is a specific metadata object that stores information about related measures, attributes and joins, but does not include the data specifically from the base fact table.

Each metadata object completes a piece of the larger picture that helps explain the meaning of the relational data. Some objects act as a base to directly access relational data by aggregating data or directly corresponding to particular columns in relational tables. Other objects describe relationships between the base metadata objects and link these base objects together. Ultimately, the present system groups all of the objects together by their relationships to each other into a multidimensional metadata object called a cube model.

A cube model comprises a set of tables that represent facts and dimensions. It contains a set of tables within a database.

It is one objective of the present system to map SQL queries to OLAP objects metadata.

Another objective of the system is to provide bridges between various OLAP vendor products and relational databases to allow the exchange of metadata. Providing bridges that allow importing of metadata into the present system helps customers quickly adapt their databases to OLAP capability. Many relational database users have not used OLAP products yet and therefore have no OLAP objects. However, these customers have SQL statements they have been executing for years. By analyzing these SQL statements and generating corresponding OLAP objects, these users can more quickly utilize the advantages of an OLAP-based system. Furthermore, the present system provides a mechanism for populating the metadata catalogs for the present system with minimal human interaction.

The algorithms of the present system could apply to any SQL statement and any OLAP object. The SQL statement could be for anything that can be accessed via SQL. OLAP objects could be produced for any OLAP product. The particular implementation of the algorithms in the present system focuses on mapping SQL from relational databases into OLAP objects, aiming to produce usable OLAP objects with no (or minimal) interaction required by the database administrator. The mapping produces functional cube models and cubes so that the metadata is immediately usable. The database administrator can later modify the OLAP objects as needed.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
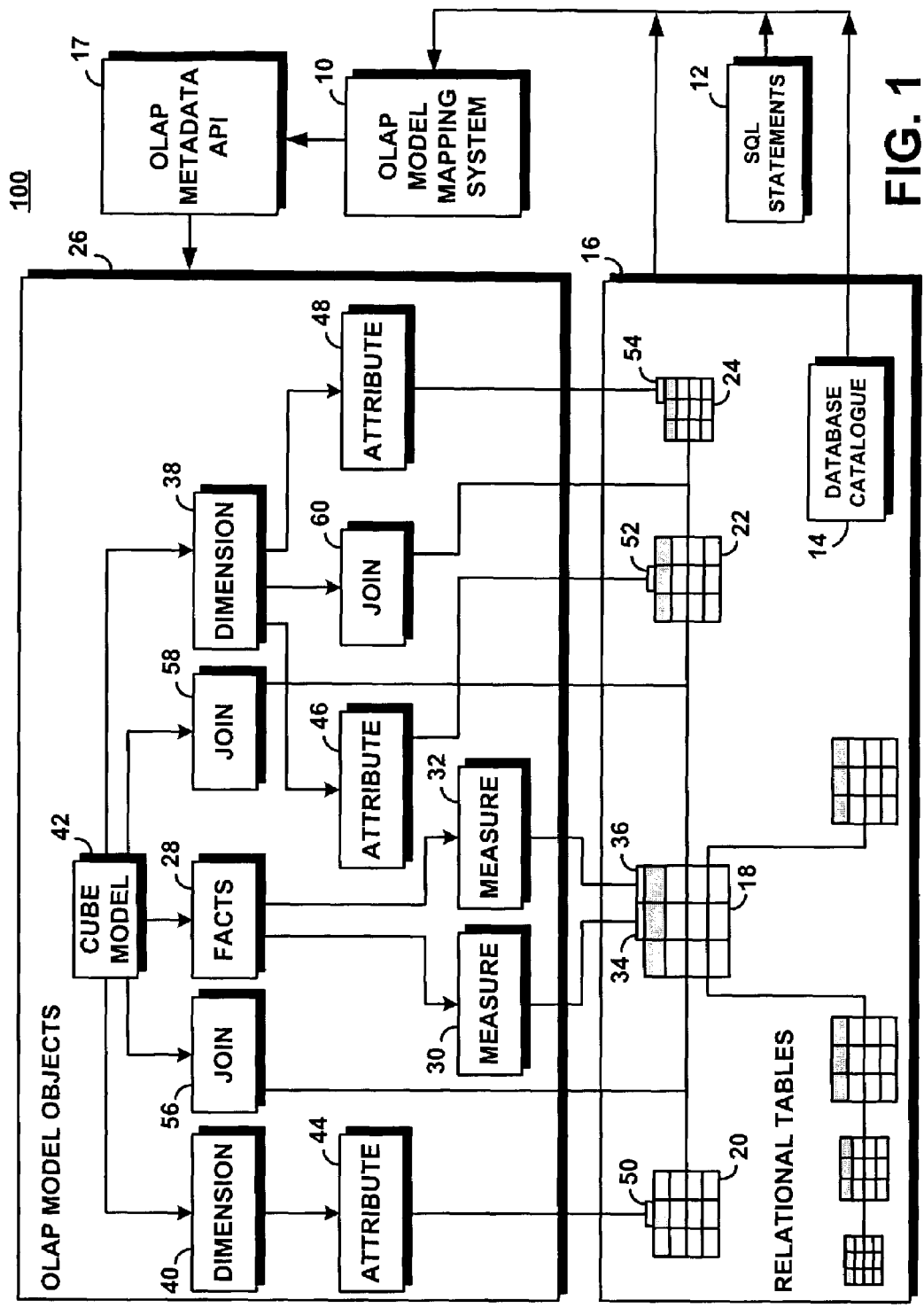
FIG. 1 is a block diagram of a high-level architecture of the automatic OLAP model building system of the present invention.

The following definitions and explanations provide background information pertaining to the technical field of the present invention, and are intended to facilitate the understanding of the present invention without limiting its scope:

API: Application Program Interface, a language and message format used by an application program to communicate with the operating system or some other control program such as a database management system (DBMS) or communications protocol.

Attribute: Represents the basic abstraction performed on the database table columns. Attribute instances are considered members in a multidimensional environment.

Attribute Relationship: describes relationships of attributes in general using a left and right attribute, a type, a cardinality, and whether the attribute relationship determines a functional dependency. The type describes the role of the right attributes with respect to the left attribute. Attributes that are directly related to the hierarchy attributes can be queried as part of the hierarchy, allowing each level of the hierarchy to define attributes that complement the information of a given level.

Cardinality: Typically refers to a count. A column cardinality refers to the number of distinct values in the column. The cardinality of a table would be its row count. For attribute relationship, the cardinality is expressed as the relationship of the counts of the attributes. A "1:N" implies that for each 1 instance on one side there are N instances on the other side.

Cube: A very precise definition of an OLAP cube that can be delivered using a single SQL statement. The cube defines a cube fact, a list of cube dimensions, and a cube view name that represents the cube in the database.

Cube Dimension: Used to scope a dimension for use in a cube. The cube dimension object references the dimension from which it is derived. It also references the cube hierarchy applied on the cube dimension. The joins and attribute relationships that apply to the cube dimension are kept in the dimension definition.

Cube Hierarchy: The purpose of a cube hierarchy is to scope a hierarchy to be used in a cube. The cube hierarchy object references the hierarchy from which it is derived, and a subset of the attributes from such hierarchy. A cube hierarchy object also references to the attribute relationships that apply on the cube.

Cube Facts: Select an ordered list of measures from a specific fact object. The purpose of a cube fact is to give the flexibility to a cube to scope a cube model's fact. The structural information, joins, and attributes, is kept in the fact object.

Cube Model: Groups facts and dimensions that are interesting for one or more applications. A cube model allows a designer to expose only relevant facts and dimensions to developers of an application. Cube models are intended for use by tools and applications that can handle multiple views of a specific dimension.

Dimension: defines a set of related attributes and possible joins among the attributes. Dimensions capture all attribute relationships that apply on attributes grouped in the dimension and also references all hierarchies that can be used to drive navigation and calculation of the dimension.

Facts: Stores a set of measures, attributes, and joins and groups related measures that are interesting to a given application. Facts are an abstraction of a fact table; however multiple database tables can be joined to map all measures in a fact object.

Hierarchy: Defines navigational and computational means of traversing a given dimension by defining relationships among a set of two or more attributes. Any number of hierarchies can be defined for a dimension. The relationship among the attributes is determined by the hierarchy type.

Join: Represents a relational join that specifies the join type and cardinality expected. A join also specifies a list of left and right Attributes and a operator to be performed.

Measure: Makes explicit the existence of a measurement entity. For each measure, an aggregation function is defined for calculations in the context of a cube model, or cube.

Schema: A database design, comprised of tables with columns, indexes, constraints, and relationships to other tables. The column specification includes a data type and related parameters such as the precision of a decimal or floating-point number.

Snowflake Schema A variation of a star schema in which a dimension maps to multiple tables. Some of the dimension tables within the schema join other dimension tables rather than the central fact table creating a long dependency. The remaining dimension tables join directly to the central fact table.

SQL: Structured Query Language, a standardized query language for requesting information from a database.

Star Schema: A schema in which all the dimension tables within the schema join directly to the central fact table.

XML: eXtensible Markup Language. A standard format used to describe semi-structured documents and data. During a document authoring stage, XML "tags" are embedded within the informational content of the document. When the XML document is subsequently transmitted between computer systems, the tags are used to parse and interpret the document by the receiving system.

FIG. 1 illustrates an exemplary high-level architecture of a relational database system 100 utilizing a system 10 that automatically builds a model for an OLAP system from SQL statements. System 10 includes a software programming code or computer program product that is typically embedded within, or installed on a computer. Alternatively, system 10 can be saved on a suitable storage medium such as a diskette, a CD, a hard drive, or like devices.

By analyzing the SQL statements 12 and information from a database catalog 14, system 10 produces information about facts, dimensions, hierarchies and other OLAP objects. A database, such as database 16, contains tables such as tables 18, 20, 22, and 24. An important aspect of the definition of the OLAP objects for database 16 is to identify the facts and dimensions within tables 18, 20, 22, and 24.

Existing relational database systems have introduced the concept of sampling data. A query is executed, but rather than fetching all the data, only a representative subset is returned. This facilitates the analysis of large amounts of data with acceptable performance. In one embodiment, the present system utilizes the sampling data.

A star schema comprises a fact table surrounded by dimension tables. A snowflake schema is a variation of a star schema in which a dimension maps to multiple tables; the tables are normalized. Each dimension is a single table. The fact table contains rows that refer to the dimension tables. Typical queries join the fact table to some of the dimension tables and aggregate data.

For example, from a fact containing sales data, a query might obtain the total revenue by month and product. The time dimension might contain year, quarter, month, and day data. The product dimension could contain detailed product information. Some dimensions reside in the fact table. A census fact table that contains a row per person might have a column for gender that could be considered a dimension.

FIG. 1 illustrates how dimensions are built from relational database 16. Hierarchies store information about how the attributes within a dimension are structured and related to each other. As a metadata object, a hierarchy provides a method to calculate and navigate the dimension. Each dimension has a corresponding hierarchy with levels defined for each member attribute. In a cube model, each dimension can have multiple hierarchies.

Relational database 16 comprises tables such as tables 18, 20, 22, 24 that are configured, for example purpose only, in a snowflake schema. The OLAP cube model objects 26 can be arranged in many ways, but are often built to represent a relational star schema or snowflake schema. A cube model based on a simple star schema is built around a central fact object 28 that describes aggregated relational data from a fact table. Measure objects 30, 32 describe data calculations from columns 34, 36 in a relational table and are contained in fact object 28. Columns of data from relational tables are represented by attribute metadata objects that can be put in a dimension object such as dimension object 38, 40.

Dimension objects 38, 40 are connected to the fact object 28 of the cube model 42 similar to the manner in which dimension tables are connected to the fact table in a star schema. Attributes 44, 46, 48 are created for the relevant dimension and fact table columns such as columns 50, 52, 54 in relational tables 20, 22, 24. Join objects 56, 58 join each key dimension to the central fact object 28 on the corresponding dimensional key attributes. Join object 60 joins two dimensions of a snowflake together.

Figure 2:
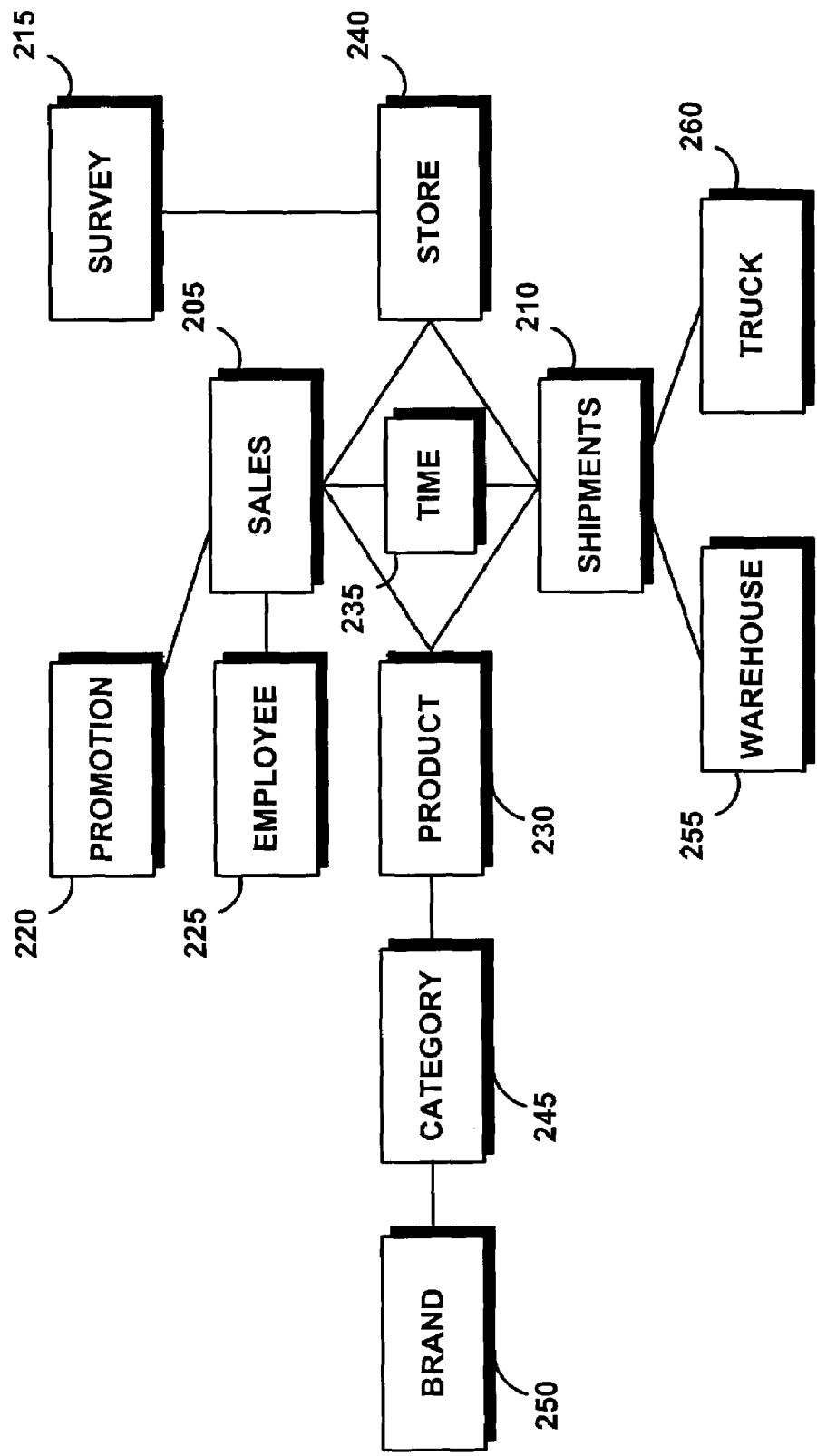
FIG. 2 is an exemplary database containing three fact tables.

FIG. 2 shows an example of a database 200 that contains three fact tables: sales 205, shipments 210, and survey 215. Sales 205 contains sales transactions at retail stores. Each row within the sales table 205 represents the sale of a product at a store. The transaction specifies which promotion was in effect when the product was sold, the employee that completed the sale, and the sales date.

Consequently, the sales table 205 has five dimensions: promotion 220, employee 225, product 230, time 235, and store 240. Each dimension has a key attribute such as PromotionID, EmployeeID, ProductID, TimeID, and StoreID. Product 230 maps to two additional tables, category 245 and brand 250. The sales table Sales 205 includes the five dimensional key attributes; the dimensions are joined with the fact table sales 205 based on either the PromotionID, EmployeeID, ProductID, TimeID, or StoreID attributes. Sales 205 is configured in a snowflake schema.

Shipments 210 contains detailed information about shipments made from the warehouse to the retail stores. Shipments 210 also has five dimensions, three of which are shared with the sales table 205: product 230, time 235, store 240, warehouse 255, and truck 260. The unique dimensions, warehouse 255 and truck 260, allow shipments 210 to specify which truck shipped the products and the product's originating warehouse. Warehouse 255 has the key attribute WarehouseID while truck 260 has the key attribute TruckID. Shipments 210 includes dimensional key attributes for its dimensions; the dimensions are joined with the fact object table shipments 210 based on either the ProductID, TimeID, StoreID, WarehouseID, or TruckID attributes. Product 230 is also configured in a snowflake schema; all other dimensions in this example are configured in star schemas.

Figure 3:
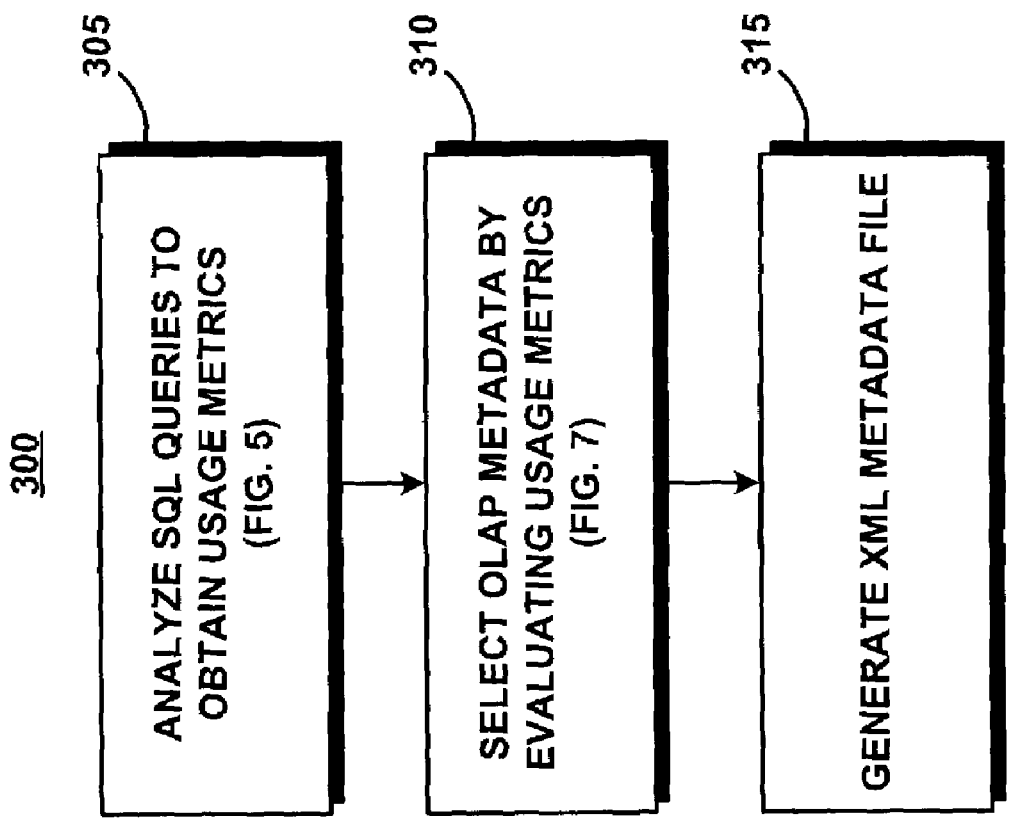
FIG. 3 is a high-level process flow chart illustrating a method of operation of the automatic OLAP model building system of FIG. 1.

A method of operation 300 of system 10 is illustrated by the high-level process flow chart of FIG. 3. At block 305, system 10 sequentially reads and analyzes SQL statements, one statement at a time. Each statement is broken into its component pieces (select expressions, join clauses, "group by" requests, etc.) and analyzed for the presence of clues to OLAP objects. Usage metrics for possible configurations are updated as each statement is processed.

By evaluating these usage metrics, system 10 selects the best candidates for OLAP objects at block 310. System 10 uses, for example, twelve different OLAP objects to map the relational database structure to OLAP: fact tables, dimension tables, cube models, hierarchy, joins, attributes, attribute relationships, measures, cubes, cube facts, cube dimensions, and cube hierarchies. Various criteria are used by system 10 to rate the candidate OLAP objects.

System 10 then generates an XML file that defines the OLAP objects as metadata at block 315 in a format that conforms to the API definition of the database management system. In one embodiment, an OLAP metadata API 17 has a GUI sub-component that generates the XML metadata file. This layer could be used if the bridge is written in Java® to reduce the coding effort.

Figure 4:
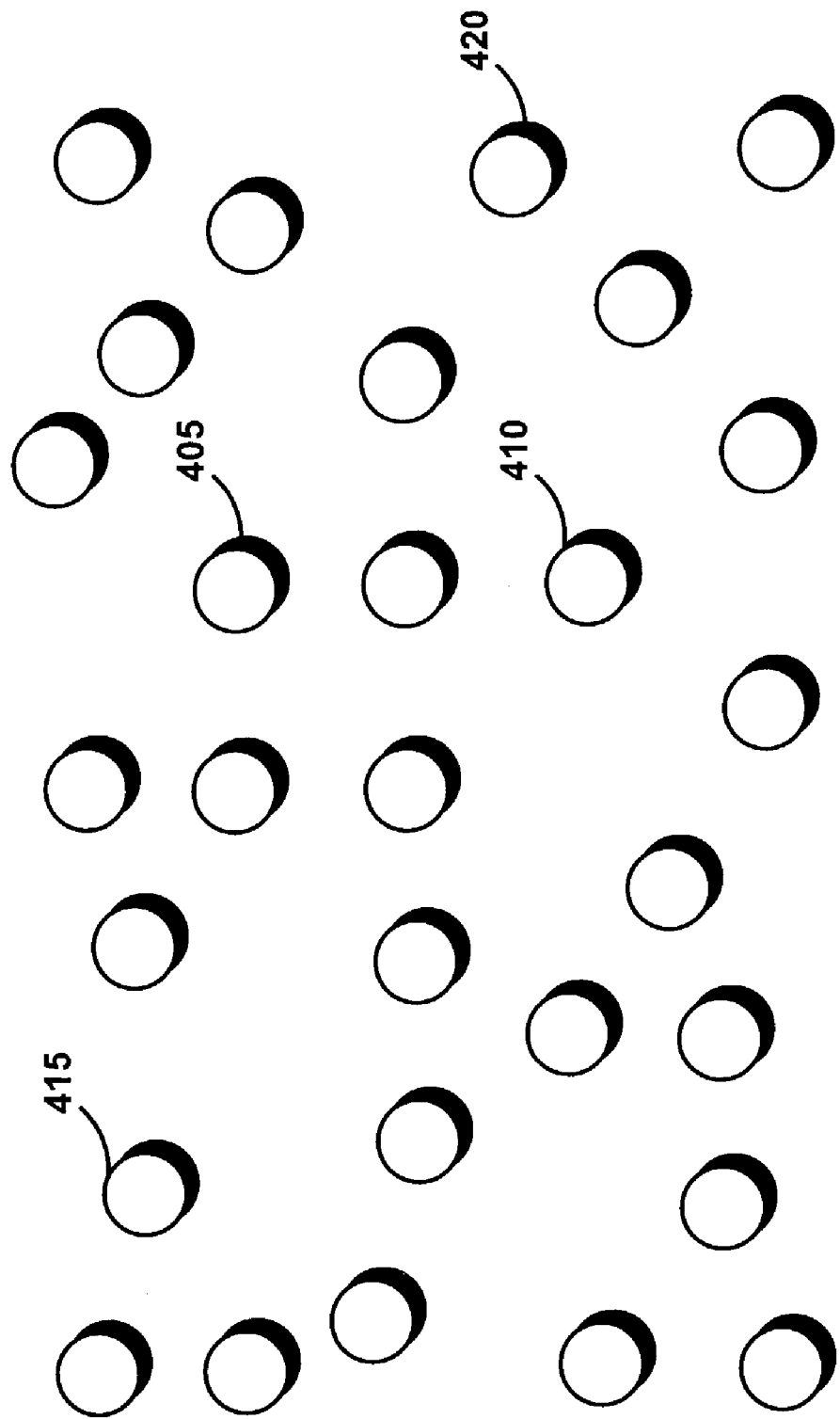
FIG. 4 is a schematic illustration showing the structure of tables in the relational database of FIG. 2 before analysis by the automatic OLAP model building system of FIG. 1.

The object of system 10 is to generate information about facts, dimensions, hierarchies and other OLAP objects from a set of SQL statements that query a database. There might be information available such as referential constraints that illuminate the relationship between the tables in the database. However, many database designers avoid defining referential constraints because they increase the cost of updating tables. Consequently, database tables can be viewed as a set of disjointed tables, as illustrated in FIG. 4. Vertices represent tables such as table 405, 410, 415, 420, etc. No lines connect the tables because relationships between the tables are unknown.

Figure 5:
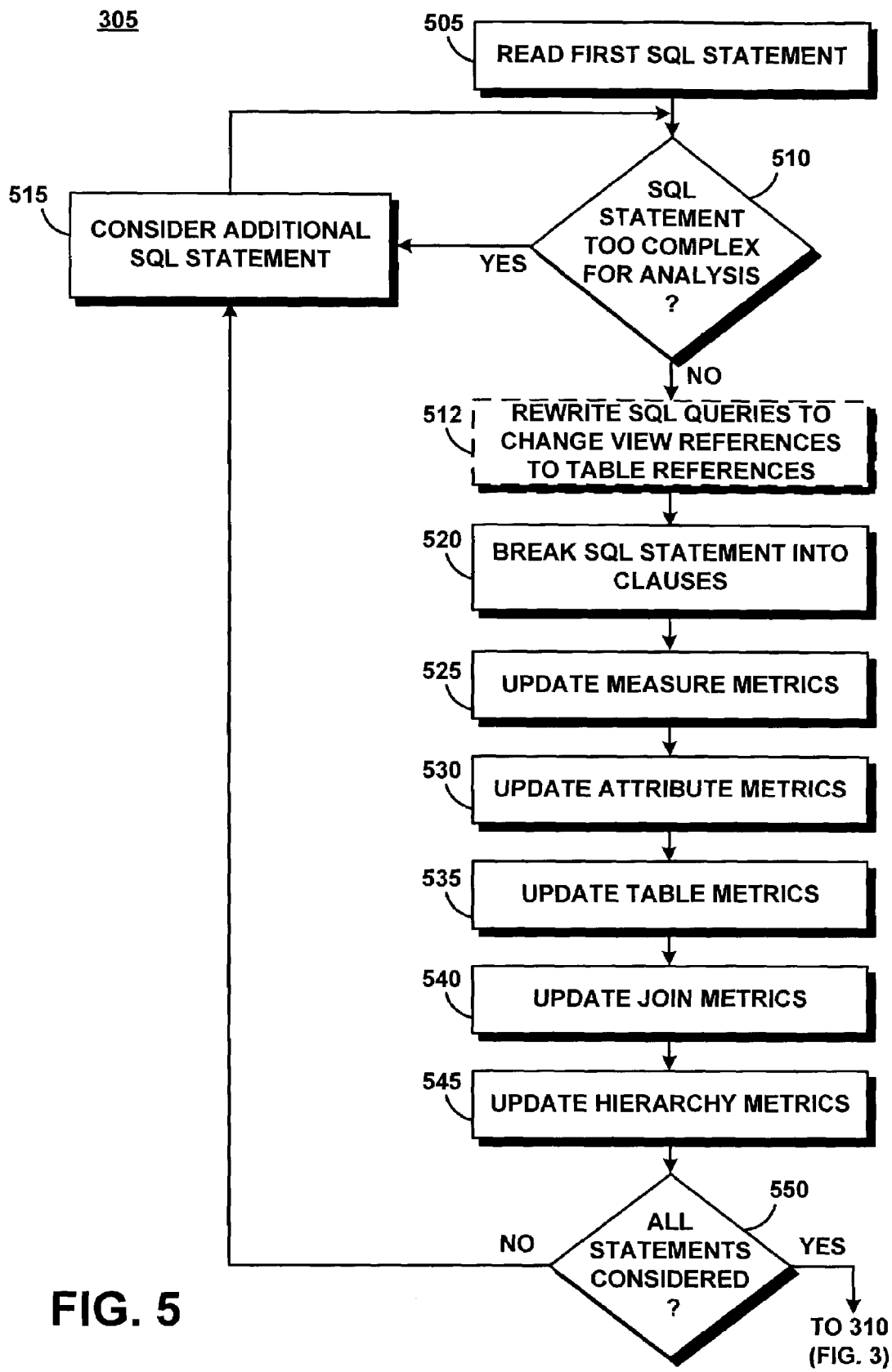
FIG. 5 is a more detailed process flow chart further describing the SQL analysis phase of operation by the automatic OLAP model building system of FIG. 1.

Block 305 of method 300 (FIG. 3) is described in more detail by the process flow chart of FIG. 5. With reference to FIG. 5, system 10 initially selects one SQL statement at block 505. At decision block 510, system 10 checks the complexity of the SQL statement. If the statement is too complex for analysis, system 10 proceeds to block 515 and selects another SQL statement. System 10 does not need to analyze every statement in SQL statements 12.

Analyzing a subset of SQL statements can still produce good recommendations of OLAP objects. Furthermore, less time is required to analyze a smaller set of SQL statements. In one embodiment, customers can filter which SQL statements are analyzed by specifying various criteria, including but not limited to query attributes such as creator, owner, creation date, modification date, last used date, query schema usage frequency, table schemas, as well as selecting a random subset of queries, etc. This also allows customers to focus on those queries they feel best represent their business requirements.

Each syntactical clause isolated at block 520 begins with a predicate such as "select", "from", "where", "group", "having", "order", etc. For example, an SQL statement might be:

```
select
    division_name,
    department_code,
    sum(dollars_sold) as sales
from
    sql2olap.sales,
    sql2olap.employee
where
    sql2olap.sales.employee_id = sql2olap.employee.employee_id
group by
    division_name,
    department_code
order by
    sales desc.
```

The clauses for this SQL statement begin with "select", "from", "where", "group by", and "order by". The aggregation, sum(dollars_sold) in this SQL statement is a measure. A measure is one or more columns to which an aggregator such as sum, average, maximum, minimum, etc. is applied. The quality of the measure is ranked by the frequency that it is used. Measures referenced frequently are more likely to indicate a fact table. Measures referenced infrequently are more likely to be "measures" within dimensions.

In one embodiment, the simplest metrics that are gathered for the OLAP objects are on a per query basis. Each time an object such as a measure, attribute, table or join appears in a query, the corresponding metric is incremented. To improve the selection of metadata weightings can be applied. There may be statistics available about query usage. This information could come from database traces or from some product that executes the queries. The statistics can be used to adjust the metrics to better reflect the relative importance of the metadata. For example, if a measure is identified that appears in a query that has a usage count of 1000, then the measure metric is incremented by 1000 instead of 1.

Queries can reference tables and views. There are different ways to process views. One way to think of views is as a saved query. But views are more than that. Views represent the users view of the structure of the database. System 10 will maintain data structures that track not only what tables were referenced by a query but whether these were actual tables or views.

There are several alternative embodiments for handling views. In one alternative embodiment, the queries are processed as they were written. The tables and views are treated in a similar way. The result being that the generated OLAP metadata will refer to both tables and views. The advantage of this approach is that it maintains the user abstractions.

In another embodiment, the SQL queries are rewritten to refer only to tables (block 512, FIG. 5, which is shown in dashed lines to indicate that this step is optional). This step would change all references to views to be references to the appropriate tables. The generated OLAP metadata will refer to tables only. The advantage of this approach is that there are situations in which performance will be improved if the metadata refers to the tables directly.

In yet another embodiment, the SQL queries are rewritten to refer only to tables (block 512, FIG. 5), but maintain information about any predicates from the view. When the metadata is defined the predicate information may be used when defining the facts object. For example, if there were lots of queries that referenced a view that had a table eventually selected as a fact table, and if there was a predicate on that fact that subsetted data, then the generated fact metadata objects will have a filter defined for it.

System 10 then analyzes the predicates to determine if they are being used as joins or to subset the data. Those predicates used to join tables should map to join objects. These joins can be categorized as:

facts to fact joins;
facts to dimension joins; or
dimension to dimension joins.

Joins are specified explicitly from the join syntax. Joins can also be specified implicitly from "where" clauses. When using "where" clauses to define the joins, system 10 performs additional analysis to determine which portion of the "where" clause is performing the join rather than using row selection.

Predicates used to subset data provide hints about hierarchies. Statements written to aggregate data for a subset of data typically do not explicitly group the data. For example, a SQL statement that creates a report for the second quarter of 2002 will probably not include a "group by" request for year and quarter even though that is the hierarchy.

A hierarchy defines navigational and computational means of traversing a given dimension. To accomplish this, a hierarchy defines relationships among a set of one or more attributes. Any number of hierarchies can be defined for a dimension. The hierarchy object also references to a set of attribute relationships that are used to link hierarchy attributes. The relationship among the attributes is described by the hierarchy type.

System 10 supports, for example, the following hierarchy types: balanced, ragged, and network hierarchy types.

A balanced hierarchy is a simple hierarchy fully populated with members at all level attributes. In a balanced hierarchy, levels have meaning to the designer.

A ragged hierarchy has varying depth at which levels have semantic meaning. The ragged hierarchy can be used, for example, to represent a geographic hierarchy in which the meaning of each level such as city or country is used consistently, but the depth of the hierarchy varies.

A network hierarchy does not specify the order of levels; however, the levels do have semantic meaning. For example, product attributes such as color and package type can form a network hierarchy in which aggregation order is arbitrary and there is no inherent parent-child relationship.

A hierarchy also specifies the deployment mechanism for the hierarchy. System 10 supports a standard deployment. In the standard deployment, each instance of an attribute corresponds to a member of that level. The standard deployment can be used with all hierarchy types.

The "group" clause provides information about hierarchies and is the primary mechanism for determining hierarchies. Examples of SQL statements using the group clause are:

select . . . group by country, region, state.
select . . . group by country, region, state, productLevel, productName.
select . . . group by year(date), month(date).
select . . . group by year, month.

The group clause provides information about hierarchies. The order of the grouped values determines the order in the hierarchy. There may be more than one hierarchy specified by the grouping. For example, the first SQL statement above has a three-level hierarchy: country, region, and state. The second SQL statement has the same three-level hierarchy plus a different two-level hierarchy: productLevel and productName.

System 10 determines the hierarchies through an analysis of the group clause; the group clause will specify one or more hierarchies implicitly. Further analysis on the origination of each column must be performed to determine which adjacent group values represent actual hierarchies. The hierarchy comprises adjacent columns. For the example above, [country, region, state] is a possible hierarchy but not [country, state]. An expression such as year(date) or month(date) in which a column has multiple functions applied to it implies that this is a hierarchy. If adjacent attributes in a group are from the same dimension and the dimension is for a different table than the facts, then these attributes comprise a hierarchy. Network hierarchies can be specified by determining if the same set of columns from the same table appear contiguously but in different orders.

In the following SQL statement there exist three possibilities for the location of country, region, and state:

select . . . group by country, region, state.

First, each column is located in a separate table and these three tables are joined to each other and to a fact table. This case is a snowflake schema and system 10 considers the columns a hierarchy. Second, each column is located in the same table and this table is joined to the fact table. This case is a star schema and system 10 considers the columns a hierarchy. Third, each column is located in the same table as the facts. This case is a "dimension in facts" situation. In this case, system 10 is unable to determine the hierarchy based on this statement alone.

If the SQL statement does not include a "group by" clause, system 10 can gain additional insight about the hierarchies from the "order by" clause. An example of an "order by" clause is select . . . order by year, month.

Suppose the SQL statement specifies predicates to obtain the data for a specific quarter and year but does no grouping. Instead the SQL statement requests an "order by" year and quarter. System 10 then assumes that the hierarchy is year and month.

System 10 classifies each table as a fact or a dimension. In some cases, a table may be both a fact and a dimension. If the table has a large number of measures or frequently referenced measures associated with it then system 10 considers it a fact. A fact object is one or more fact tables that can be directly joined (i.e., adjacent nodes) and have a strong join affinity. If the table has level attributes from hierarchies or has few measures, then it is a dimension. Dimension objects are a single dimension table or multiple dimension tables that have a strong join affinity. If an aggregation is used such as "sum (sales)", system 10 maps the clause to a measure. Otherwise, system 10 maps the clause to an attribute.

Analyzing an SQL statement results in information such as tables referenced, which tables were joined, which measures (aggregations) were used, which groupings were performed and how the data was ordered. All of these data provide metrics accumulated for later analysis. After analyzing the SQL statement, system 10 updates the measure metrics at block 525.

At block 530, system 10 updates the attribute metrics. The attributes are values that are not aggregations. An attribute can involve multiple columns in addition to other attributes.

The level attribute is used to define hierarchies. Common level attributes are, for example, Year, Quarter, State, and City. Description attributes are used to associate additional descriptive information to a given attribute. A common scenario for Product, for example, is to have a main attribute with a product code and a description attribute with a textual description. The dimensional attribute represents different characteristics and qualities of a given attribute. Common dimensional attributes are Population, Size, etc. Dimensional key attributes represent the primary key in a dimension table or a foreign key used in a fact table to represent a dimension table. In addition, a key attribute is used for keys other than dimensional keys. Key attributes may be used in a snowflake dimension.

System 10 updates the table metrics at block 535, the join metrics at block 540, and the hierarchy metrics at block 545. System 10 then looks for more SQL statements at decision block 550. If additional SQL statements are available for analysis, system 10 returns to block 515 and repeats blocks 510 through 550. Otherwise, system 10 proceeds to block 310 of FIG. 3. For any one SQL statement, the analysis by system 10 may be incorrect. However, as system 10 analyzes additional SQL statements, the credibility of candidate OLAP objects increases and the analysis accuracy increases.

Figure 6:
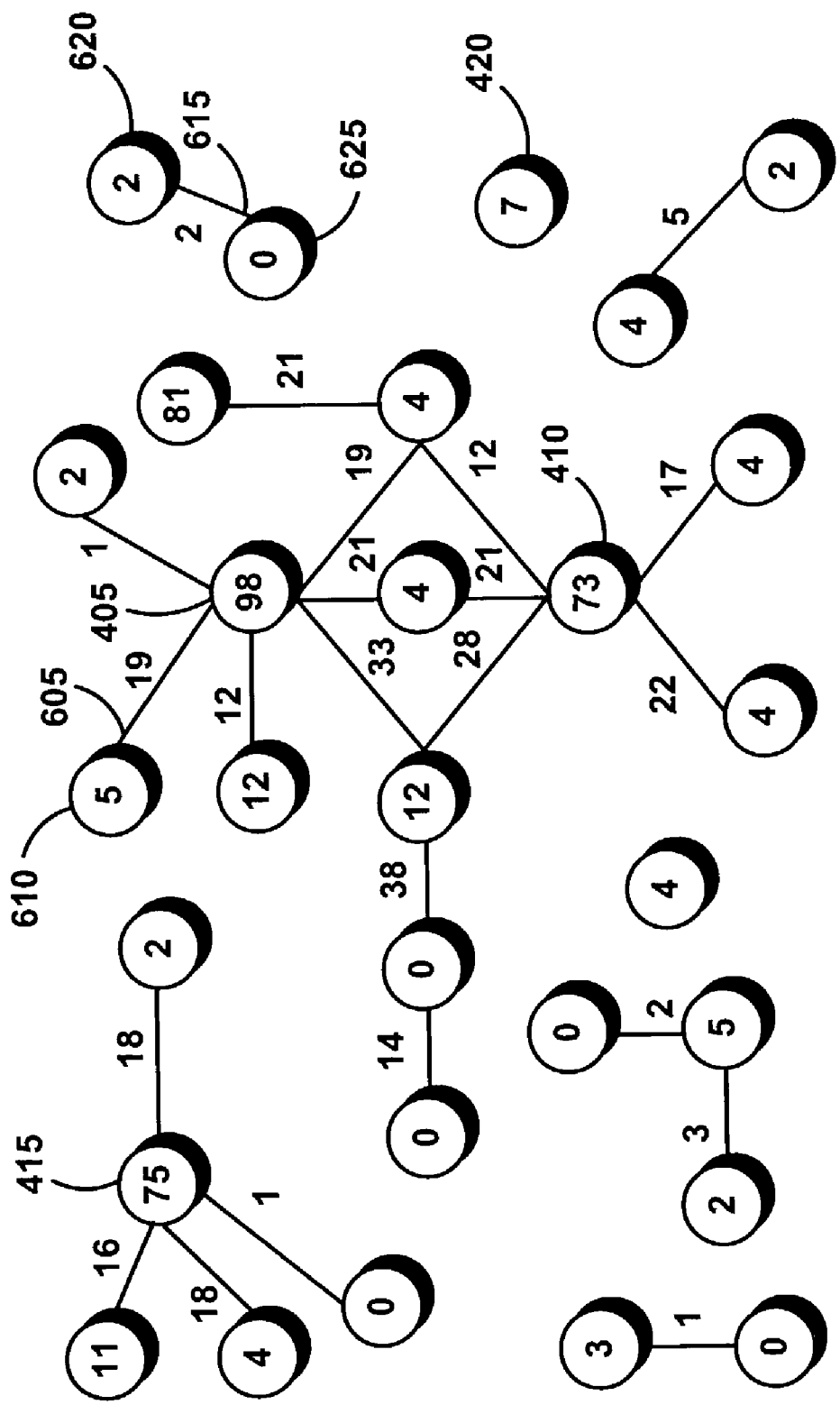
FIG. 6 is a schematic illustration showing the structure of tables in the relational database of FIG. 4 after SQL analysis by the automatic OLAP model building system of FIG. 1.

The most important metrics accumulated by system 10 are the join metrics and measure metrics. FIG. 6 shows the join and measure metrics for the tables of FIG. 4 after SQL statement analysis performed by system 10. Edges (lines) between tables represent a join between those tables. The edge has a number associated with it that specifies the number of times these tables were joined in the SQL statements. Line 605 indicates that tables 610 and 405 were joined 19 times; line 615 indicates that tables 620 and 625 were joined two times. Line 605 represents a strong join while line 615 represents a weak join. The number inside a table vertex indicates the quantity of measures used with the table. For example, table 405 has 98 measures used, table 410 has 73 measures, table 415 has 75 measures, and table 620 has two measures. Database constraints are also represented graphically as a line between tables when these constraints are used in the relational database. Contrasted with the disorder of FIG. 4, relationships are appearing between the tables in FIG. 6. Constraints get a very high join metric rating that implies a very strong join relationship.

Numerous SQL expressions have common parts. For example:
Select sum(A) from . . .
Select sum(B) from . . .
Select sum(A)+sum(B) from . . .
Select 1.06* sum(A) from . . .
Select sum(A)−sum(B) from . . .

Sum(A) and sum(B) are common to all of the foregoing clauses. An alternative embodiment would be to break the expression in the SQL select clause into component pieces, in order to produce a more concise set of measures.

If all the unique expressions are mapped to measures, there may be an overwhelming number of measures that differ in insignificant ways. These would clutter the metadata and potentially impact optimization based on the metadata. If only the common subexpressions are selectively mapped to the metadata, then important metadata is lost such as complex formulas. One implementation is to map very commonly used expressions directly to measures, but to also look for subexpressions that may be referenced frequently as well.

Figure 7:
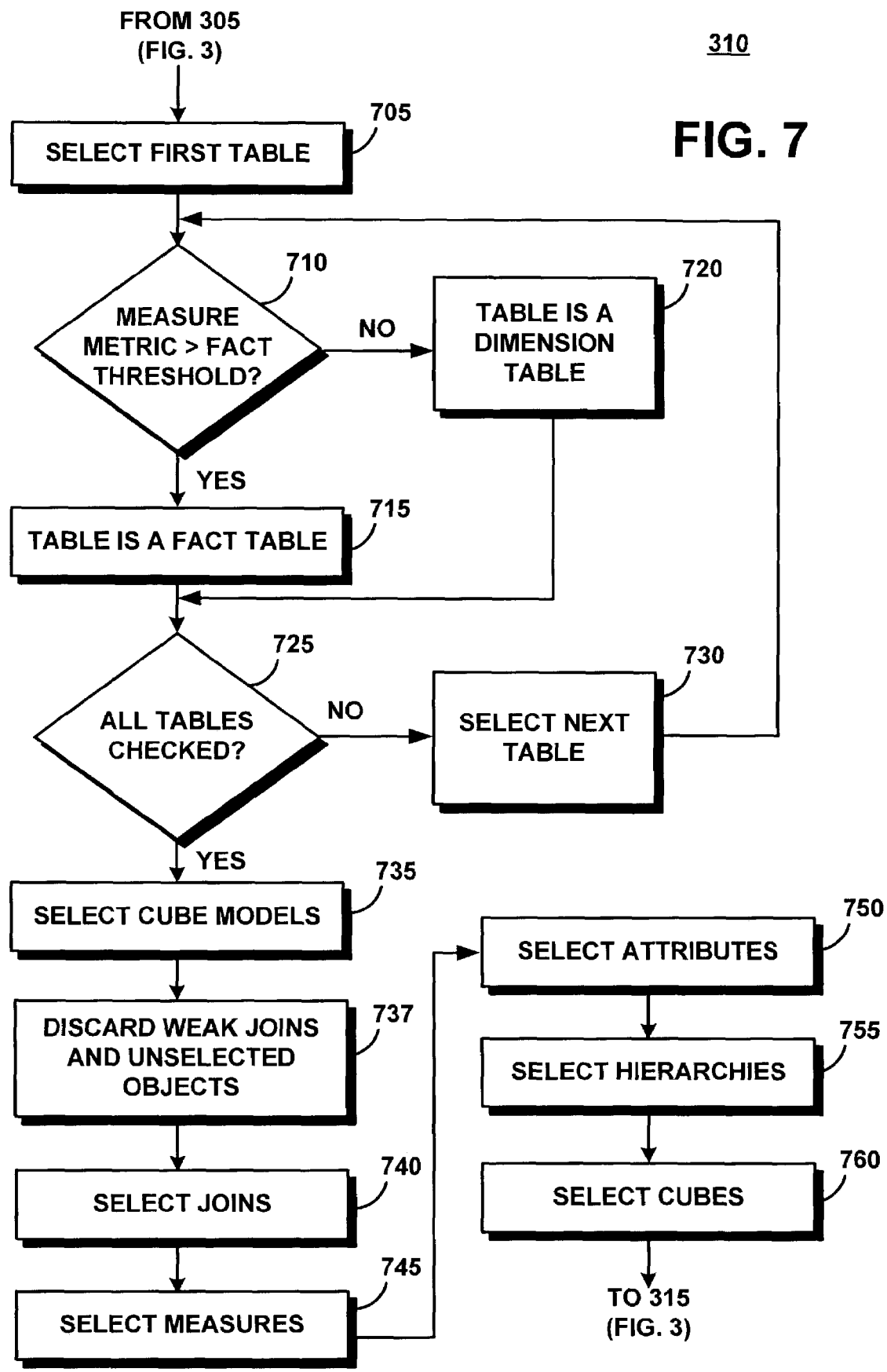
FIG. 7 is a more detailed process flow chart further describing the OLAP object selection phase of operation by the automatic model building system of FIG. 1.

Block 310 of method 300 of FIG. 3 is described in more detail in the process flow chart of FIG. 7. After aggregating the metrics resulting from SQL analysis (block 305), system 10 selects the first table at block 705 of FIG. 7. At decision block 710, system 10 compares the measure metric for the selected facts with the facts measure threshold.

The fact rating is obtained by adding the measure ratings of all measures contained in the table. One embodiment of the present invention allows a client to control the threshold. As an example, an absolute threshold for marking as a fact and having a relative threshold such as select the 5% of tables with the highest ratings. Other metrics can alternatively be used to select a fact. For example, a high row count is generally a property of fact tables rather than dimension tables. The core metrics should be viewed as a starting point but not a comprehensive list of heuristics. It should be understood by a person of ordinary skill in the field that heuristics comprise, but are not limited to a set of rules used for evaluation purposes.

Fact tables contain many measures, corresponding to the large amount of factual data within the fact table. Dimension tables can also contain factual data. However, the resulting measure from that factual data is much less than that of the fact tables. If the table has more measures than the fact table threshold, system 10 designates the table as a fact table at block 715. A fact object may reference multiple tables.

The following are exemplary rules used by system 10 when specifying fact tables:
1. A fact table must refer to at least one measure.
2. All attributes and measures to which a fact table refers must be joinable. Only fact table joins are considered.
3. In a fact context, only a single join can be defined between two given tables.
4. No join loops are allowed in a fact table.
5. All joins to which a fact table refers must refer to attributes in the fact table.

If the measure metrics of the table do not meet the threshold for a fact table, system 10 designates the table as a dimension table at block 720. A dimension object may reference multiple tables.

The following are exemplary rules used by system 10 in designating a table as a dimension table:
1. A dimension table must refer to at least one attribute.
2. All attributes to which a dimension table refers must be joinable. Only dimension table joins are considered.
3. No join loops are allowed in a dimension table.
4. In a dimension table context, only a single join can be defined between two given tables.
5. All attribute relationships to which a dimension table refers must refer to the dimension table's attributes.
6. All joins to which a dimension table refers must refer to the dimension table's attributes.
7. All hierarchies to which a dimension table refers must refer to the dimension table's attributes.

A single table can be part of both fact and dimension objects. Also, one table may contain multiple dimensions. If it is unclear whether adjacent tables are fact tables or dimension tables, system 10 uses row count and other criteria such as column datatypes to define the table type at decision block 710. In general, fact tables have much larger row counts than dimension tables. The dimension tables are tables adjacent to fact tables with high join counts. Not all tables joined to the fact table are considered dimension tables; some tables joined infrequently will be ignored by system 10. At decision block 725, system 10 determines if all tables have been designated as either fact or dimension. If additional tables must be checked, system 10 proceeds to block 730, selects the next table, and repeats blocks 710 through 725.

Once the dimension tables have been identified, system 10 defines the cube model for each fact table at block 735. A cube model is a fact table plus any adjacent joinable dimension tables. If necessary, adjacent fact tables can be placed into the same "facts" object" to make the dimension table and fact table configuration fit within the cube model constraints. A "facts" object can contain multiple "fact tables", just as a "dimension" can contain "multiple dimension tables".

The following are exemplary object rules followed by system 10 in creating cube models:
1. A cube model must refer to zero or one fact tables.
2. A cube model must refer to zero or more dimension tables.

3. Every dimension object must be joinable with the fact object. Only cube model joins are considered.
4. In a cube model context, only a single join can be defined between two given tables.

At this stage, the key metadata and core objects have been selected.

During the selection process, system 10 retains the key objects and eliminates peripheral objects at block 737. All objects identified by SQL statement analysis could be mapped to OLAP objects. However, this will likely result in a metadata catalog largely filled with information that is not very important. By filtering on usage, system 10 maps the key objects to OLAP objects. In one embodiment, customers are allowed to control this filtering process by setting usage thresholds. As indicated earlier, this filtering could be implemented in several ways including based on an absolute rating or a relative rating such as select the top rated 20% of metadata. Now that the key objects have been selected the remaining objects can be defined based on this core set.

System 10 then proceeds to select joins at block 740. The following are exemplary rules used by system 10 to select joins:
1. A join must refer to at least one triplet (left attribute, right attribute, operator).
2. All left attributes in the join must resolve into column(s) of a single table.
3. All right attributes in the join must resolve into column(s) of a single table.

System 10 selects measures at block 745. The following are exemplary rules used by system 10 to select measures:
1. A measure can have all or none of the following as parameters for the SQL template: attributes, columns, measures.
2. The attributes and measures used as parameters for SQL templates must not generate a dependency loop among attributes and/or measures.
3. The SQL template can not be an empty string.
4. No aggregator function is allowed as part of the SQL template.
5. The aggregator property is mandatory when a column or attribute function is referenced in the SQL template.

At block 750, system 10 selects attributes. The attributes are values that are not aggregations. The following are exemplary rules used by system 10 used by system 10 to select attributes:
1. An attribute can have all or none of the following as parameters for the SQL template: attributes or columns.
2. The attributes when used as a parameter for SQL templates must not generate a dependency loop among attributes.
3. The SQL template can not be an empty string.
4. No aggregator function is allowed as part of the SQL template.

System 10 also selects attribute relationships at block 750. The following are exemplary rules used by system 10 to select attributes relationships:
1. An attribute relationship must refer to two attributes.
2. An attribute relationship can not be defined as having cardinality=N:N and functional dependency=Yes.

The group clause will contain both level attributes and attribute relationships. While system 10 may not be able to distinguish between the two based on the analysis of a single statement, the attribute relationships become obvious when many SQL statements are analyzed. System 10 then selects hierarchies at block 755. The following are exemplary rules used by system 10 in selecting hierarchies:

1. A hierarchy must refer to at least one attribute.
2. Every attribute relationship within a hierarchy must have the left attribute as part of the hierarchy.
3. Every attribute relationship with a hierarchy must have cardinality of 1:1 or N:1.

At block 760, system 10 selects the cube. Cubes are commonly referenced and strongly correlated subsets of cube models. A key feature of the cubes is that each dimension has a single hierarchy, unlike a cube model that supports multiple hierarchies. If the cube model has no dimensions with multiple hierarchies, system 10 would simply include every dimension with its complete hierarchy in the cube.

In more complex cases, system 10 analyzes the dimensions referenced by the SQL statements. For example, a cube model may have 20 dimensions; of 1000 SQL statements, 400 referenced some combination of dimensions D1, D2, D3, D4, D5, D6, and D7. None of these 400 statements referenced any dimension other than these seven. System 10 would then define a cube containing these seven dimensions based on the affinity within the SQL statements for these dimensions.

The following are exemplary rules used by system 10 when selecting the cube:
1. A cube must refer to one cube fact.
2. A cube must refer to at least one cube dimension.
3. The cube facts must be derived from the fact table used in the cube model.
4. All cube dimensions must be derived from the dimensions used in the cube model.

System 10 also selects cube facts using the following exemplary rules:
1. A cube fact must refer to one fact table.
2. A cube fact must refer to at least one measure.
3. All measures to which the cube fact refer must be part of the fact table.

System 10 then selects cube dimensions using the following exemplary rules:
1. A cube dimension must refer to one dimension table.
2. A cube dimension must refer to at least one attribute.
3. All attributes to which a cube dimension refers must be part of the dimension table.
4. A cube dimension must refer to a cube hierarchy.
5. All attributes to which the cube hierarchy refers must be part of the cube dimension.

Finally, system 10 selects cube hierarchies using the following exemplary rules:
1. A cube hierarchy must refer to one hierarchy.
2. A cube hierarchy must refer to at least one attribute.
3. All attributes to which a cube hierarchy refers must be part of the hierarchy.
4. The order of the attributes in the cube hierarchy must be the same as in the hierarchy. This rule does not apply to hierarchies defined as network.

Figure 8:
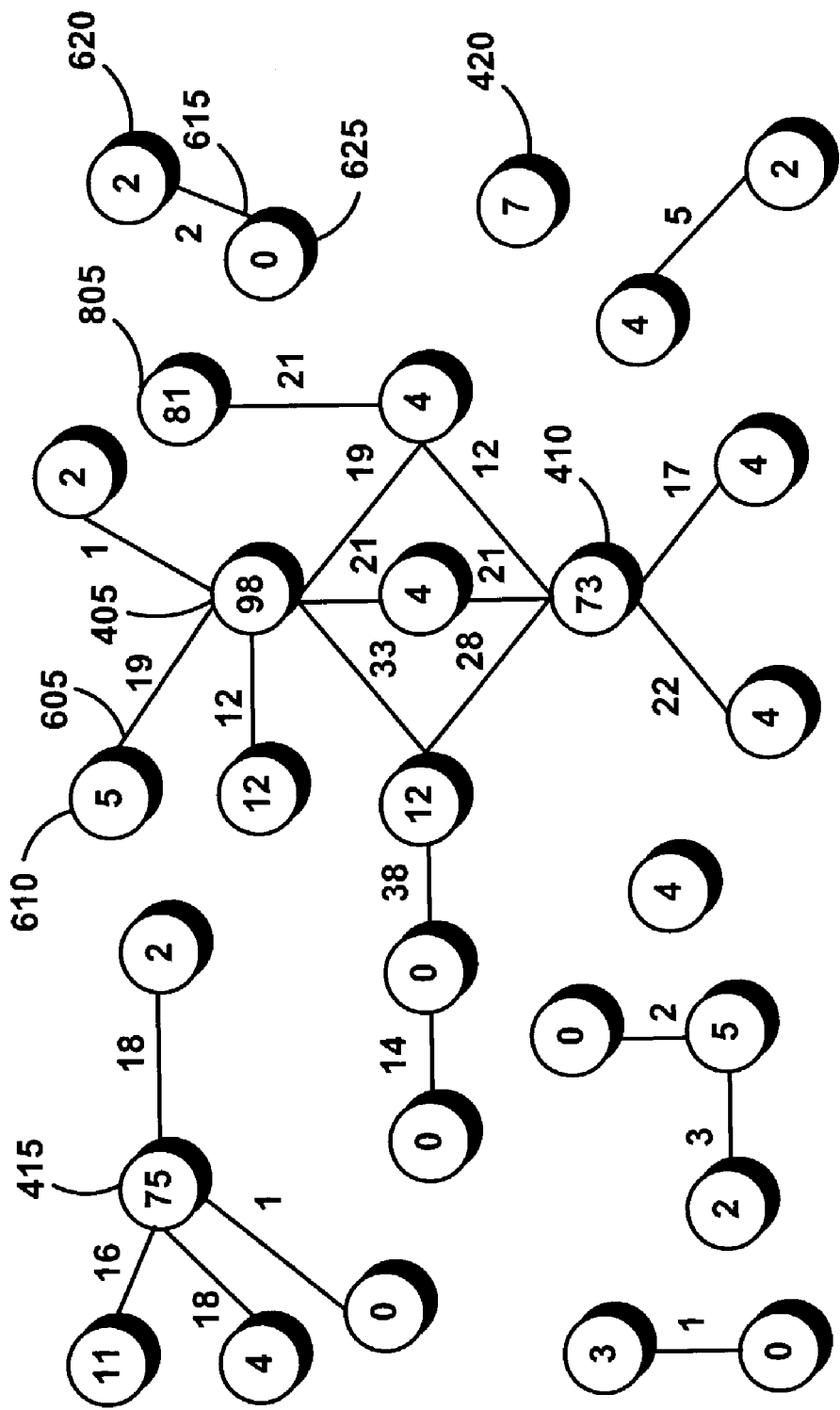
FIG. 8 is a schematic illustration showing the selection of fact tables from results of the SQL analysis of FIG. 6 by the automatic OLAP model building system of FIG. 1.

FIG. 8 illustrates the method of system 10 for selecting fact tables. Tables 405, 410, 415, and 805 all have high measure counts compared to the rest of the tables. System 10 designates these tables as fact tables.

Figure 9:
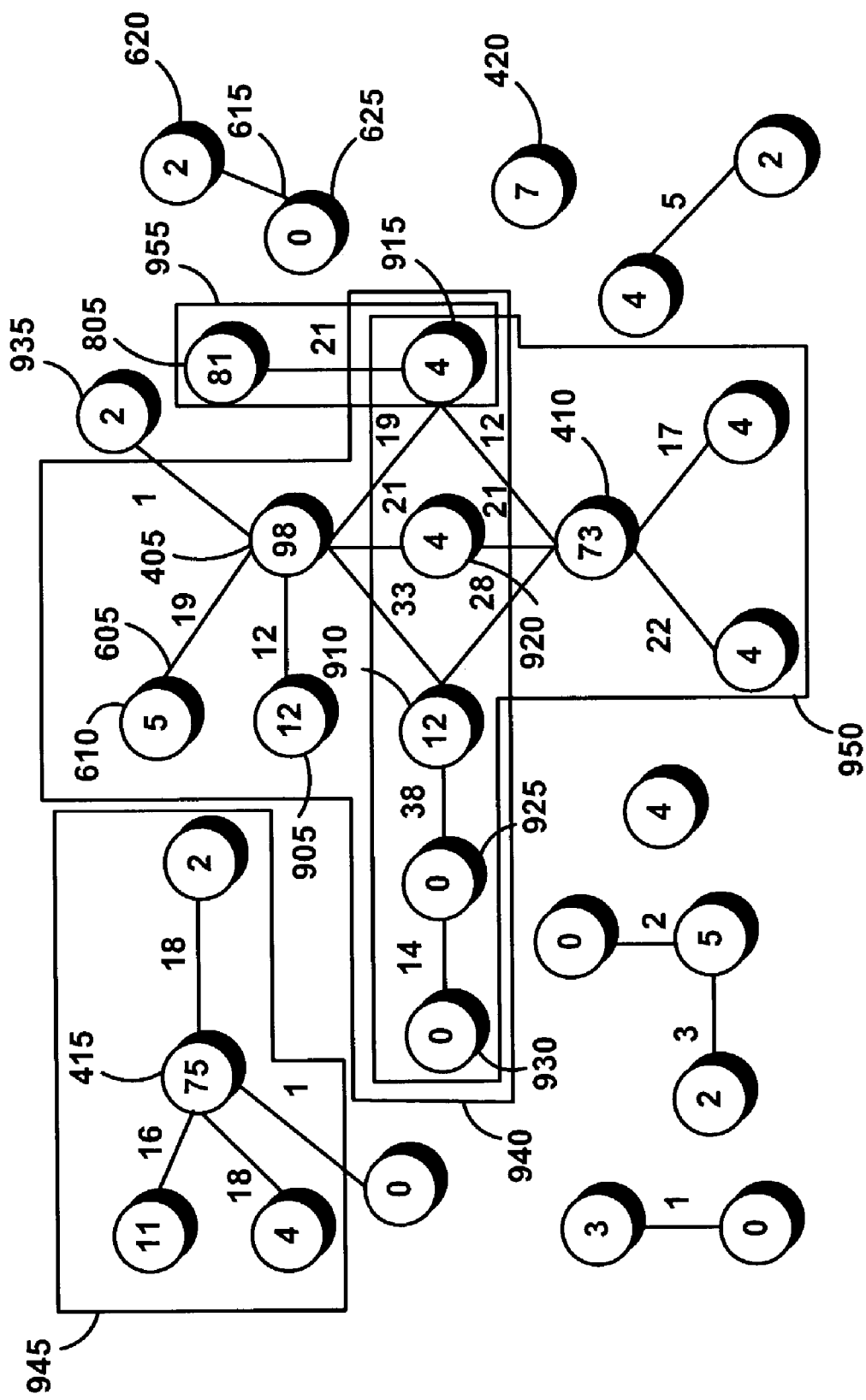
FIG. 9 is a schematic illustration showing the selection of cube models based on the fact tables selected in FIG. 8 by the automatic OLAP model building system of FIG. 1.

FIG. 9 illustrates the method of system 10 for selecting dimension tables for each fact table and thus selecting the cube model for each fact. System 10 creates a cube model for each fact table. Cube models can overlap among the dimension tables.

A dimension table is associated with a fact table if the join between the dimension table and the fact table is a strong join. Tables 610, 905, 910, 915 and 920 have strong joins to fact table 405. In addition, table 925 has a strong join to table 910 and table 930 has a strong join to table 925. Table 935 has a weak join to table 405, so is not considered a dimension table for table 405. System 10 then creates a cube model 940 for the table 405. System 10 creates cube models 945, 950, and 955 by following a similar process.

Figure 10:
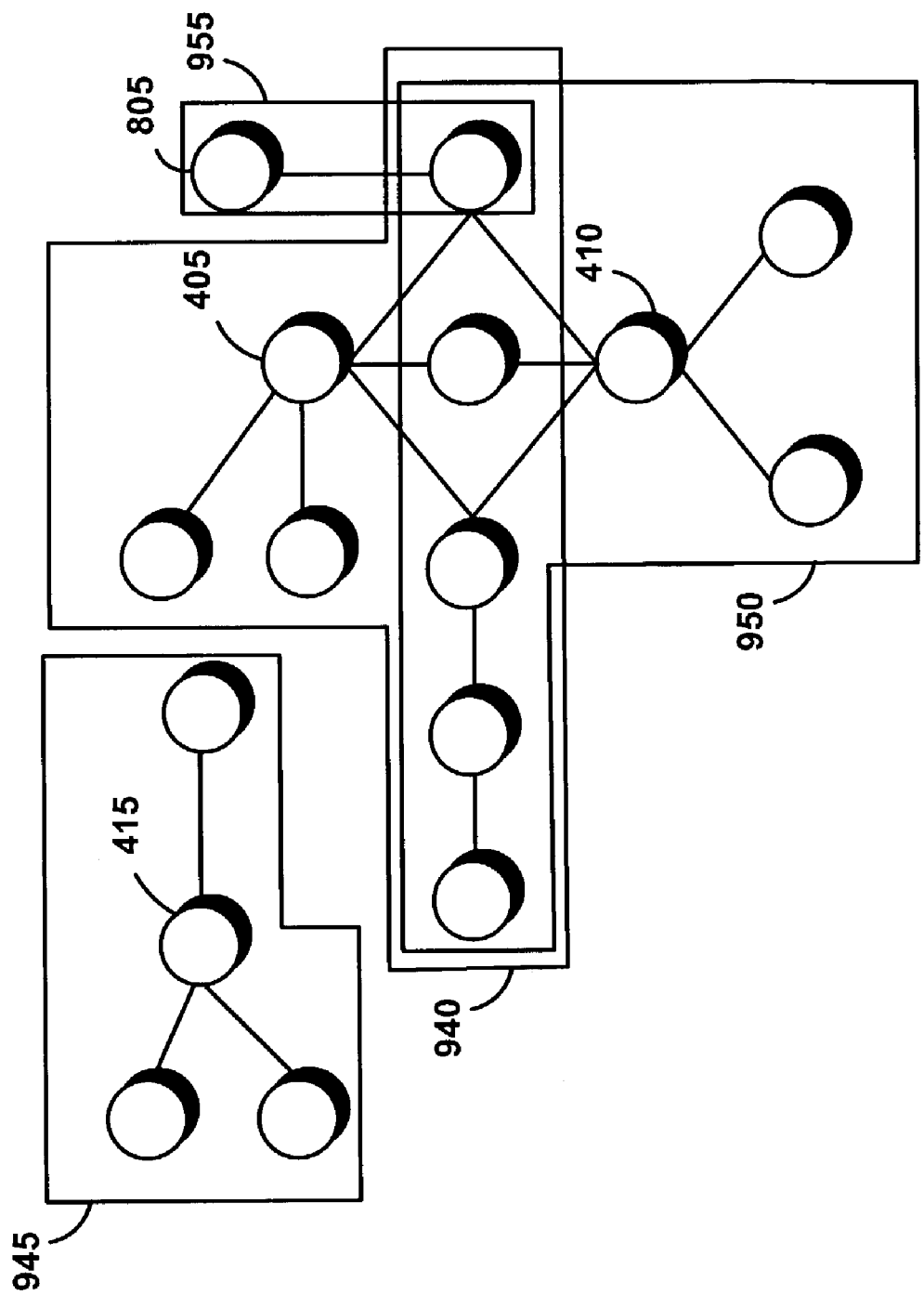
FIG. 10 is a schematic illustration showing the selection of key objects based on the cube models selected in FIG. 9 by the automatic OLAP model building system of FIG. 1.

The key objects are those within the cube models 940, 945, 950 and 955. All other objects are dropped by system 10, as seen in FIG. 10. System 10 has mapped a snowflake schema from SQL statements for cube models 940 and 950; a simple star schema has been mapped for cube models 945 and 955. In this example, cube model 955 is shown to have a dimension within the fact table. At this point, system 10 can use statistics and sampling in a supporting role to refine the cube models. Statistics and sampling give system 10 refined clues for cube model schemas.

The interpretation of any one SQL statement by system 10 may be incorrect. An SQL statement against a dimension may look the same as a statement against a fact. However, when system 10 aggregates the analysis of many SQL statements, the facts, dimensions, and other OLAP objects become more obvious. System 10 also uses sampling to analyze the correlation of columns, cardinalities to analyze columns, and query history (dynamic statistics) in addition to a static view of existing queries to further refine the OLAP structure for the relational database.

The primary input to the mapping process is SQL queries. But other information is also available that assists in the analysis. For example, there may be information that indicates the frequency that queries are run. This allows the focus to be on queries that are actually run rather than those that merely exist. The database has statistics about tables and columns. These statistics can help make decisions. For example, table row counts can be used to help spot fact tables. Column cardinalities can help choose attribute relationships. Sampling (i.e., the process of reading a subset of table data) can be implemented as a means of quickly spotting relationships between columns. This can help spot attribute relationships.

The following series of SQL statements illustrate the method used by system 10 to analyze and interpret SQL statements for a relational database with unknown structure. The first SQL statement analyzed is:

```
echo Display total sales.;
select
    sum(sales) as sales
from
    tbc.salesfact.
```

Figure 11A:
FIG. 11 is comprised of FIGS. 11A, 11B, 11C, and 11D, and is an illustration of a model mapped from SQL statements by the automatic OLAP model building system of FIG. 1.

The select clause in the preceding SQL statement has a single expression that is an aggregation and a reference to a salesfact table. System 10 interprets this aggregation, sum(sales), as a measure. Since the salesfact table has a measure, system 10 increments the fact metric for that table by one. The results of the analysis of this SQL statement is illustrated in FIG. 11A; the single table, salesfact 1105 has a fact measure of one. The salesfact table might actually be a dimension table rather than a fact table but this can not be determined from one SQL statement. Because system 10 analyzes a large number of SQL statements, system 10 anticipates many aggregations referencing fact tables and a much smaller number referencing dimensions.

System 10 analyzes a second SQL statement:

```
echo Display sales by product.;
select
    tbc.product.skuname,
    sum(sales) as sales
from
    tbc.salesfact,
    tbc.product
where
    tbc.salesfact.productid = tbc.product.productid
group by
    tbc.product.skuname.
```

Figure 11B:
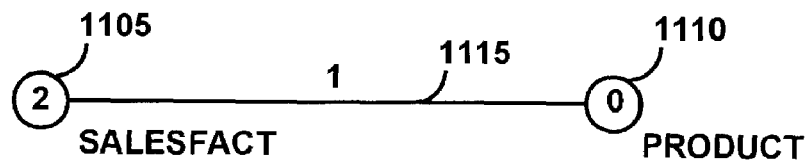

This SQL statement references two tables, the product table and the salesfact table. The select clause in this SQL statement has two values, the skuname and the aggregate sum(sales). System 10 considers the aggregation as a measure, while the non-aggregation, skuname, is not a measure. Skuname is an attribute that participates in a hierarchy that is specified by the "group by" clause. Since this SQL statement references two tables, it is important for system 10 to determine the source table for each select expression. Since skuname (the level attribute) comes from the product table, system 10 interprets the product table as a dimension. System 10 interprets salesfact as a fact table since sum(sales) appears to originate from the salesfact table. Consequently, system 10 increments the facts measure for the salesfact table by one. The where clause contains a fact-dimension join between the product table and the salesfact table; system 10 increments the join metric between the product table and the salesfact table by one. The results of analysis of the second SQL statement are shown in FIG. 11B. The table salesfact 1105 has a fact metric of two. The table product 1110 is joined to salesfact 1105 by join 1115 with a join metric of one.

System 10 analyzes a third SQL statement:

```
echo Display sales by product within California.;
select
    tbc.product.skuname,
    sum(tbc.salesfact.sales) as sales
from
    tbc.salesfact,
    tbc.product,
    tbc.market,
    tbc.region,
    tbc.time
where
    tbc.salesfact.productid = tbc.product.productid and
    tbc.salesfact.stateid  = tbc.market.stateid and
    tbc.market.regionid    = tbc.region.regionid and
    tbc.salesfact.timeid   = tbc.time.timeid and
    tbc.market.state = 'California' and
    tbc.time.year = '2000' and
    tbc.time.quarter = 'Qtr2'
group by
    tbc.product.skuname.
```

Although this SQL statement is more complex, system 10 still interprets it incrementally. As before, the sum(sales) aggregation is a measure; consequently, system 10 increments the fact metric for the aggregation's source table, the salesfact table, by one. System 10 identifies a hierarchy on the product name, skuname, from the "group by" clause. The product name, skuname, is a level attribute. Four tables are joined in this SQL statement: salesfact is joined to product;

salesfact is joined to market; market is joined to region, salesfact is joined to time. System 10 increments the join metrics between these tables by one.

Figure 11C:
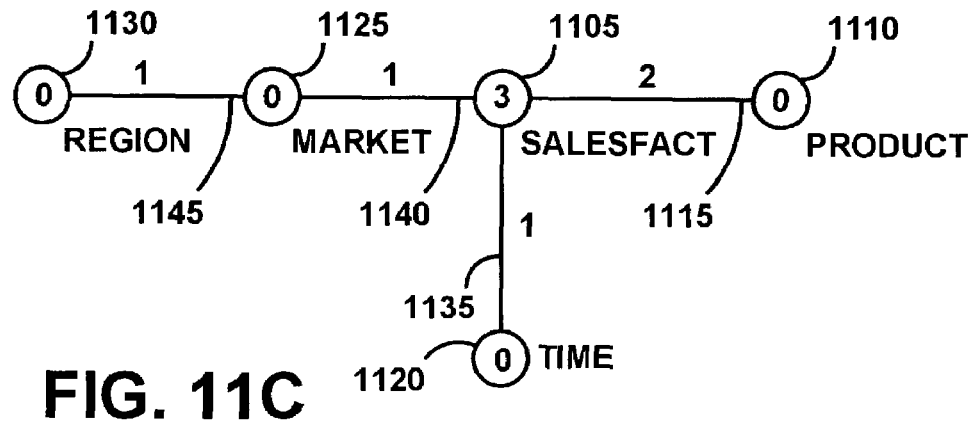

The results of analysis of the third SQL statement are shown in FIG. 11C. Salesfact 1105 now has a fact metric of 3. Join 1115 has increased to two. Three additional tables have been added: time 1120, market 1125, and region 1130. Time 1120 is joined to salesfact 1105 by join 1135, market 1125 is joined to salesfact 1105 by join 1140, and region 1130 is joined to market 1125 by join 1145. This is not a simple star schema with a fact table surrounded by dimension tables. For example, while salesfact 1105 is joined directly to product 1110, market 1125 and time 1120 it is not joined to region 1130. Consequently, this is a snowflake schema where dimensions may comprise multiple tables; only one of these tables may be joined to the fact table.

Although the "group by" clause references only one column, the "where" clause has predicates on three columns: state, year, and quarter. System 10 recognizes this as a clue that these three columns are levels within hierarchies. This SQL statement provides less information here than if the three columns were explicitly listed in the "group by" clause. For example, system 10 can determine no order for the three columns. However, an aggregation is in effect performed for these values by the SQL statement.

The SQL analysis phase will maintain a significant number of metrics and data structures. The present graph diagrams represent a small percentage of the information and metrics maintained, and represent exemplary core metrics. It should be understood that other metrics can also exist. As an example, hierarchies need to be tracked. This means that for each SQL statement there exists one or more possible hierarchies. All of the possible hierarchies need to be tracked with usage counts maintained so that the best candidates can be selected during the metadata selection phase. Join information needs to include which columns of the tables were joined. Eventually, when OLAP joins are defined, attributes need to be defined for these columns.

In addition to keeping counts of how often each a join is done, tracking of which tables were joined in tandem will also be done. As an example, suppose there are 3 queries:

Query 1 joins A to B, B to C, C to D.
Query 2 joins A to B, B to C, C to X.
Query 3 joins A to B, B to C, C to T, T to Z.

It would be important to know, not just how many times each pair of tables was joined, but also that the combination of queries A-B-C appears 3 times.

The fourth SQL statement for this relational database might be:

```
echo Display sales, cogs and profit by product for each state.;
select
    tbc.region.region,
    tbc.market.state,
    tbc.product.skuname,
    sum(tbc.salesfact.sales) as sales,
    sum(tbc.salesfact.cogs) as cogs,
    sum(tbc.salesfact.sales - tbc.salesfact.cogs) as profit
from
    tbc.salesfact,
    tbc.product,
    tbc.market,
    tbc.region
where
    tbc.salesfact.productid = tbc.product.productid and
    tbc.salesfact.stateid   = tbc.market.stateid and
    tbc.market.regionid     = tbc.region.regionid
```

-continued

```
group by
    tbc.region.region,
    tbc.market.state,
    tbc.product.skuname.
```

The select clause in this SQL statement has three measures (all from salesfact) and three non-measures. The "group by" lists three columns which should be considered a possible hierarchy: region, state, and skuname. There are several possible hierarchies here ranging from one three-level hierarchy to three one-level hierarchies:

(region, state, skuname)

(region, state), (skuname)

(region), (state, skuname)

(region), (state), (skuname)

Since the market and region tables are joined in a snowflake configuration a reasonable interpretation would be that the hierarchies are (region, state) and (skuname).

Figure 11D:
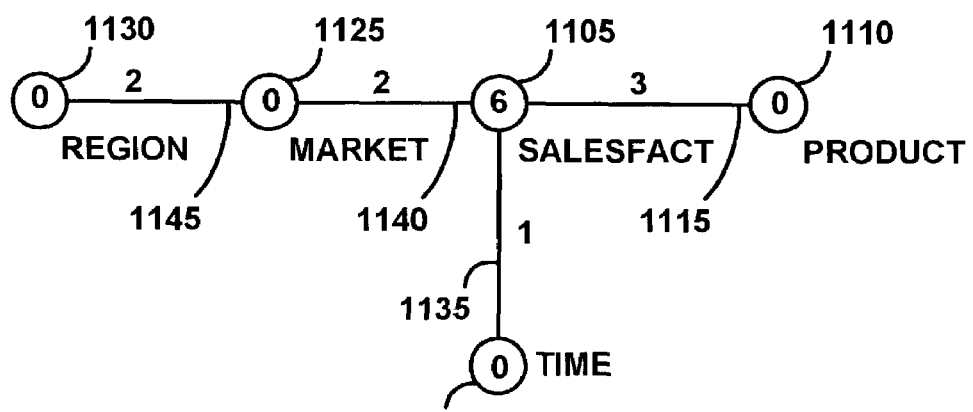

The results of analysis of the fourth SQL statement are shown in FIG. 11D. The fact metric for salesfact 1105 is now six, and joins 1145, 1140, 1115, and 1135 have all been incremented by one. After analyzing four SQL statements, salesfact 1105 still appears to be the fact table with product 1110, time 1120, market 1125, and region 1130 the dimension tables. Join 1135 between time 1120 and salesfact 1105 is weaker than joins 1145, 1140, and 1115 and may be dropped after many more SQL statements have been analyzed.

A second relational database example is as follows. The first SQL statement for this exemplary database is:

```
echo Show distances run by year.;
select
    year(date) as year,
    count(*) as runs,
    sum(distance) as distance
from
    run
group by year(date).
```

This SQL statement references one table, the run table. The select clause has two aggregations (count and sum) and one non-aggregation (year(date)). System 10 considers the run table as a fact since both aggregations came from this table. The "group by" clause implies there is a one-level hierarchy of year. The year function is applied to date; date originates from the run table. Consequently, system 10 considers the run table as a dimension and the run table has both fact and dimensional information. Tables that have both fact and dimensional information are often used in relational database. For example, a fact table for a census would probably contain a number of columns that contained dimensional data. To classify the gender of people listed in the table there might be a single char(1) column with M or F. This approach would be easier for the database designer than creating a completely new table just for gender. Even though a single table serves as a fact and dimension, OLAP object metadata requires a fact-dimension join to be defined. System 10 defines this join using the primary key of the table.

A second SQL statement for the second relational database example might be:

```
echo Show running statistics by month.;
select
    year(date) as year,
    month(date) as month,
    cast(count(distance) as smallint) as num__run,
    cast(sum(distance) as decimal(6,2)) as sum__dist,
    cast(avg(distance) as decimal(4,2)) as avg__dist,
    max(distance) as max__dist,
    min(distance) as min__dist,
    duration(avg(seconds(duration))) as avg__duration,
    duration(max(seconds(duration))) as max__duration,
    duration(min(seconds(duration))) as min__duration,
    duration(avg(seconds(pace))) as avg__pace,
    duration(max(seconds(pace))) as max__pace,
    duration(min(seconds(pace))) as min__pace,
    cast(avg(speed) as decimal(4,2)) as avg__speed,
    max(speed) as max__speed,
    min(speed) as min__speed
from run
group by cube(year(date), month(date))
order by year(date), month(date).
```

Within this SQL statement, system 10 identifies two non-measures (year and month) and 14 measures (5 aggregations on distance and 3 aggregations to each of duration, pace, and speed). The "group by" clause implies either a two-level hierarchy (year, month) or two one-level hierarchies (year) (month). Since these expressions are based on the same underlying column it is reasonable to assume the hierarchy is (year, month).

It is to be understood that the specific embodiments of the invention that have been described are merely illustrative of certain application of the principle of the present invention. Numerous modifications may be made to the method for automatically building an OLAP model from a relational database invention described herein without departing from the spirit and scope of the present invention. Moreover, while the present invention is described for illustration purpose only in relation to relational databases, it should be clear that the invention is applicable as well to any database or collection of data lacking a metadata description.

What is claimed is:

1. A method for automatically building metadata objects for use by a multidimensional analysis program from a set of query statements, comprising:
    analyzing the query statements to obtain usage metrics;
    generating metadata of the multidimensional analysis program from the query statements by evaluating the usage metrics to select candidate metadata objects and defining one or more metadata objects from the candidate metadata objects; and
    populating the metadata of the multidimensional analysis program by creating the one or more defined metadata objects.

2. The method of claim 1, wherein the multidimensional analysis program comprises an on-line analytical processing, OLAP, program; and
    wherein the query statements comprise SQL statements.

3. The method of claim 2, wherein the OLAP product comprises a relational OLAP, ROLAP, program.

4. The method of claim 2, wherein the OLAP product comprises a hybrid OLAP, HOLAP, program.

5. The method of claim 2, wherein the OLAP product comprises a multidimensional OLAP, MOLAP, program.

6. The method of claim 2, further comprising acquiring the SQL statements from an SQL statement source.

7. The method of claim 2, wherein analyzing the SQL statements comprises analyzing at least one of the SQL statements for references to tables, expressions, joins, predicates, groupings, havings, and ordering.

8. The method of claim 7, further comprising building an object configuration of cube models.

9. The method of claim 8, wherein building the object configuration of cube models comprises building at least one of facts, dimensions, hierarchies, joins, attributes, measures, attribute relationships, cubes, cube facts, cube dimensions and cube hierarchies.

10. The method of claim 2, wherein generating metadata comprises selectively filtering the metadata based on heuristics.

11. A computer program product having instruction codes for automatically building metadata objects for use by a multidimensional analysis program from a set of query statements, comprising:
    a first set of instruction codes for analyzing the query statements to obtain usage metrics;
    a second set of instruction codes for generating metadata of the multidimensional analysis program from the query statements by evaluating the usage metrics to select candidate metadata objects and defining one or more metadata objects from the candidate metadata objects; and
    a third set of instruction codes for populating the metadata of the multidimensional analysis program by creating the one or more defined metadata objects.

12. The computer program product of claim 11, wherein the multidimensional analysis program comprises an on-line analytical processing, OLAP, program; and
    wherein the query statements comprise SQL statements.

13. The computer program product of claim 12, wherein the OLAP product comprises a relational OLAP, ROLAP, program.

14. The computer program product of claim 12, wherein the OLAP product comprises a hybrid OLAP, HOLAP, program.

15. The computer program product of claim 12, wherein the OLAP product comprises a multidimensional OLAP, MOLAP, program.

16. The computer program product of claim 12, further comprising a fourth set of instruction codes for acquiring the SQL statements from an SQL statement source.

17. The computer program product of claim 12, wherein the first set of instruction codes analyzes at least one of the SQL statements for references to tables, expressions, joins, predicates, groupings, havings, and ordering.

18. The computer program product of claim 17, further comprising a fifth set of instruction codes for building an object configuration of cube models.

19. The computer program product of claim 18, wherein the fifth set of instruction codes builds at least one of facts, dimensions, hierarchies, joins, attributes, measures, attribute relationships, cubes, cube facts, cube dimensions and cube hierarchies.

20. The computer program product of claim 12, wherein the second set of instruction codes selectively filters the metadata based on heuristics.

21. A system for automatically building metadata objects for use by a multidimensional analysis program from a set of query statements, comprising:
    means for analyzing the query statements to obtain usage metrics;
    means for generating metadata of the multidimensional analysis program from the query statements by evaluating the usage metrics to select candidate metadata objects and defining one or more metadata objects from the candidate metadata objects; and means for populating the metadata of the multidimensional analysis program by creating the one or more defined metadata objects.

22. The system of claim 21, wherein the multidimensional analysis program comprises an on-line analytical processing, OLAP, program; and wherein the query statements comprise SQL statements.

23. The system of claim 22, wherein the OLAP product comprises a relational OLAP, ROLAP, program.

24. The system of claim 22, wherein the OLAP product comprises a hybrid OLAP, HOLAP, program.

25. The system of claim 22, wherein the OLAP product comprises a multidimensional OLAP, MOLAP, program.

26. The system of claim 22, further comprising means for acquiring the SQL statements from an SQL statement source.

27. The system of claim 22, wherein the means for analyzing the SQL statements analyzes at least one of the SQL statements for references to tables, expressions, joins, predicates, groupings, havings, and ordering.

28. The system of claim 27, further comprising means for building an object configuration of cube models.

29. The system of claim 28, wherein the means for building the object configuration of cube models builds at least one of facts, dimensions, hierarchies, joins, attributes, measures, attribute relationships, cubes, cube facts, cube dimensions and cube hierarchies.

30. The system of claim 22, wherein the means for generating metadata of the multidimensional analysis program from the SQL statements selectively filters the metadata based on heuristics.

* * * * *